(12) United States Patent
Bhandari et al.

(10) Patent No.: US 10,351,634 B2
(45) Date of Patent: Jul. 16, 2019

(54) ENCAPSULATION OF GASES WITHIN CYCLODEXTRINS

(71) Applicant: THE UNIVERSITY OF QUEENSLAND, St Lucia (AU)

(72) Inventors: Bhesh Bhandari, Brisbane (AU); Binh Thanh Ho, Brisbane (AU)

(73) Assignee: THE UNIVERSITY OF QUEENSLAND, St. Lucia (AU)

( * ) Notice: Subject to any disclaimer, the term of this patent is extended or adjusted under 35 U.S.C. 154(b) by 729 days.

(21) Appl. No.: 14/434,638

(22) PCT Filed: Oct. 10, 2013

(86) PCT No.: PCT/AU2013/001170
§ 371 (c)(1),
(2) Date: Apr. 9, 2015

(87) PCT Pub. No.: WO2014/056035
PCT Pub. Date: Apr. 17, 2014

(65) Prior Publication Data
US 2015/0272148 A1    Oct. 1, 2015

(30) Foreign Application Priority Data
Oct. 10, 2012  (AU) ................. 2012904421

(51) Int. Cl.
C08B 37/16 (2006.01)
A23B 7/152 (2006.01)
A23B 7/153 (2006.01)
A23B 7/144 (2006.01)
A23N 15/06 (2006.01)

(52) U.S. Cl.
CPC .......... *C08B 37/0015* (2013.01); *A23B 7/144* (2013.01); *A23B 7/152* (2013.01); *A23B 7/153* (2013.01); *A23N 15/06* (2013.01)

(58) Field of Classification Search
None
See application file for complete search history.

(56) References Cited

U.S. PATENT DOCUMENTS

| 6,017,849 A | 1/2000 | Daly et al. |
| 6,713,113 B2 | 3/2004 | Bisperink et al. |
| 6,953,592 B2 | 11/2005 | Darbyshire et al. |
| 2002/0061822 A1 | 5/2002 | Kostansek |

FOREIGN PATENT DOCUMENTS

| WO | 2006/011044 | 2/2006 |
| WO | 2011/062950 | 5/2011 |

OTHER PUBLICATIONS

Neoh, Tze Loon, et al. "Kinetics of molecular encapsulation of 1-methylcyclopropene into α-cyclodextrin." Journal of agricultural and food chemistry 55.26 (2007): 11020-11026.*
International Search Report for PCT/AU2013/001170, nine pages, dated Nov. 18, 2013.
Furutani et al. "Asymmetric [2+2] photocycloaddition of cycloalkenone-cyclodextrin complexes to ethylene" *Chirality*, vol. 18, No. 3, pp. 217-221 (Jan. 2006).
Ho et al. "Encapsulation of ethylene gas into α-cyclodextrin and characterization of the inclusion complexes" *Food Chemistry*, vol. 127, No. 2, pp. 572-580 (Jul. 2011).
Ho et al. "Release kinetics of ethylene gas from ethylene-α-cyclodextrin inclusion complexes" *Food Chemistry*, vol. 129, No. 3, pp. 259-266 (Nov. 2011).

* cited by examiner

*Primary Examiner* — Abigail Vanhorn
*Assistant Examiner* — Daniel L Branson
(74) *Attorney, Agent, or Firm* — Nixon & Vanderhye P.C.

(57) ABSTRACT

An inclusion complex of an amorphous α-cyclodextrin, or derivative thereof, with encapsulated ethylene is provided by exposure of the dry solid amorphous α-cyclodextrin to ethylene gas under pressure. The inclusion complex will have applications in a number of fields including fruit ripening.

20 Claims, 21 Drawing Sheets

ENCAPSULATION OF GASES WITHIN CYCLODEXTRINS

This application is the U.S. national phase of International Application No. PCT/AU2013/001170, filed 10 Oct. 2013, which designated the U.S. and claims priority to Australian Application No. 2012904421, filed 2012 Oct. 10; the entire contents of each of which are hereby incorporated by reference.

FIELD OF THE INVENTION

The invention relates to the field of molecular encapsulation. More particularly, this invention relates to an inclusion complex of a gas, such as ethylene, in a cyclodextrin and its use in applications such as ripening of fruit.

BACKGROUND TO THE INVENTION

Any reference to background art herein is not to be construed as an admission that such art constitutes common general knowledge in Australia or elsewhere.

The expectation of consumers is that supermarkets and grocery outlets will provide a regular seasonal supply of fruits such as bananas, apples, mangoes and avocados in or near to a ripened state. This means that the fruit must be in a state, in terms of firmness, sweetness and color, close to being ready for consumption and hence desirable to the consumer.

The challenge in achieving this is that, often, the fruit will be grown in a region which is geographically distant from the point of sale. In countries such as Australia, fruit may be transported over extremely long distances by road and, in the case of imported fruits, long transport times by boat are often necessitated. Fruit which was already in a ripened state when transported would be over ripe by the time it reaches its destination and, due to the softness of ripe fruit, a significant percentage of the fruit would be damaged in transit.

For these reasons many climacteric fruits are harvested in an unripe state. The fruit will therefore be relatively hard and can be transported safely. The fruit will then be delivered to dedicated ripening rooms to encourage ripening prior to distribution to retailers.

Ripening rooms create a controlled environment that attempts to replicate the climatic conditions of heat and humidity where the fruits were grown. The ripening effect is brought about in the main by the introduction of ethylene gas into the ripening rooms. Ethylene is released naturally by many fruits, such as bananas for example, and is a known ripening agent.

The use of ripening rooms does present a number of disadvantages. Firstly, it adds significantly to the length of the supply chain resulting in lost sales and profits to fruit producers and retailers, due to the delay, and often poor quality fruit. This is particularly accentuated where there is limited supply at the start of the season when prices are their highest. Secondly, the operators of the ripening rooms charge 20-30 cents per kg to ripen fruit which reduces the efficiency, profitability and transparency of the supply chain and consolidates control to a few market agents. Thirdly, not all growers are able to have consistent access to ripening rooms due to a small presence in the market or the cost being prohibitive and so growers of, for example, stone fruits, may end up providing unripened fruit to the market. This puts consumers off further buying of that fruit and can significantly damage the market for it. Finally, those growers in developing countries may not have the option of sophisticated ripening rooms at all due to the lack of infrastructure.

It would be useful to be able to ripen the fruit in an alternative manner such that it can be delivered direct to the retailer without the delay involved in the use of ripening rooms. This would allow the fruit to be transported in a relatively hard unripe state and soften only at the end of transportation thereby minimising damage.

The problem is that high levels of ethylene in the trucks would be dangerous due to its high flammability. Further, modification of the trucks may be necessary to contain the ethylene levels as it would be dispensed very quickly from the cylinder. There are also inherent dangers in carriage of pressurised cylinders.

Molecular encapsulation techniques have been used to trap ethylene as a guest molecule inside a macromolecular host, such as cyclodextrin (CD). However, current methods require very high pressures over relatively long time periods to achieve fairly modest loading of the ethylene into the CD. Ho et al (Food Chemistry 127 (2011) 572-580) provided a means for incorporating ethylene into $\alpha$-CD to form a crystalline inclusion complex showing an approximate 1:1 molar ratio of ethylene to CD. The method employed involved the dissolution of $\alpha$-CD in water followed by exposure to ethylene gas in a pressurised environment. It was found that the yield of the crystalline ethylene/$\alpha$-CD inclusion complex increased, to a point, with increasing pressures and time. However, the maximum yield obtained was less than 45% after 5 days at a pressure of 1.5 MPa.

It would be useful to provide a controlled release ethylene source which could be safely used to ripen fruit in transit and which could be obtained at relatively low cost.

OBJECT OF THE INVENTION

It is an aim of this invention to provide for an ethylene/CD inclusion complex which overcomes or ameliorates one or more of the disadvantages or problems described above, or which at least provides a useful alternative.

Other preferred objects of the present invention will become apparent from the following description.

SUMMARY OF INVENTION

According to a first aspect of the invention, there is provided an inclusion complex of an amorphous cyclodextrin, or derivative thereof, and encapsulated gaseous molecule.

The amorphous cyclodextrin may be $\alpha$-, $\beta$- or $\gamma$-cyclodextrin or alkylated, hydroxylated or sulfonated derivatives thereof.

Preferably, the amorphous cyclodextrin is amorphous $\alpha$-cyclodextrin or a derivative thereof.

The gaseous molecule encapsulated within the amorphous cyclodextrin, or derivative thereof, may be a small molecule of less than 6 non-hydrogen atoms.

Preferably, the gaseous molecule is selected from the group consisting of methane, ethane, propane, ethylene, propylene, butylene, 1-methylcyclopropene, carbon dioxide and nitrous oxide.

Most preferably, the gaseous molecule is ethylene.

An inclusion complex of amorphous $\alpha$-cyclodextrin and encapsulated ethylene is defined by the XRD data as shown in FIG. 1. The amorphous $\alpha$-cyclodextrin is defined by the XRD data shown in FIG. 10.

The inclusion complex of amorphous $\alpha$-cyclodextrin and encapsulated ethylene may comprise at least 0.1, 0.3, 0.5, 0.7, preferably at least 0.8, more preferably at least 0.85, even more preferably at least 0.90 and still more preferably at least 0.95 moles of ethylene per mole of α-cyclodextrin.

According to a second aspect of the invention there is provided a method of producing an inclusion complex of amorphous cyclodextrin, or derivative thereof, and encapsulated gaseous molecule including the steps of:
(a) providing a solution of a cyclodextrin, or derivative thereof;
(b) actively removing the solvent from the solution of cyclodextrin to form a solid amorphous cyclodextrin, or derivative thereof, powder; and
(c) exposing the solid amorphous cyclodextrin, or derivative thereof, powder to a gaseous molecule, to thereby produce the inclusion complex of amorphous cyclodextrin, or derivative thereof, and encapsulated gaseous molecule.

Suitable cyclodextrins and gaseous molecules and relative amounts thereof will be as discussed for the first aspect.

The solvent may be a polar, semi-polar or ionic solution.

Preferably, the solution of cyclodextrin is an aqueous solution.

The step of removing the solvent may include the step of evaporating the solvent and/or spray drying and/or freeze drying the solution of cyclodextrin.

Preferably the cyclodextrin, or derivative thereof, is α-cyclodextrin and the step of spray drying the solution may include the step of supplying the solution of α-cyclodextrin to an atomizer to atomize the solution into droplets.

The step of spray drying the solution of α-cyclodextrin may further include the step of drying the atomized droplets of solubilised α-cyclodextrin by exposing them to a drying gas.

The temperature of the drying gas will vary depending on the nature of the solvent employed. Suitably, the drying gas is heated to between 200° C. to 150° C. inlet temperature and between 60° C. to 90° C. outlet temperature. Preferably, the inlet temperature is about 180° C. and the outlet temperature is about 80° C.

Preferably, the amorphous cyclodextrin is substantially dry prior to exposure to the gaseous molecule.

The amorphous cyclodextrin powder may be exposed to the gaseous molecule in a closed gas tight environment.

The amorphous cyclodextrin powder may be exposed to the gaseous molecule under pressure.

Suitably, the amorphous cyclodextrin powder is exposed to the gaseous molecule at greater than atmospheric pressure. Suitably, the exposure is at a pressure between about 0.1 MPa to less than about 5 MPa, preferably between about 0.5 MPa to about 3 MPa, more preferably between about 1.0 MPa to about 2.0 MPa.

In one embodiment, the amorphous cyclodextrin powder is exposed to the gaseous molecule for a time of between 1 h to 120 h, preferably between about 5 h to about 96 h, more preferably between about 12 h to about 72 h, even more preferably between about 24 h to about 54 h.

A third aspect of the invention resides in an inclusion complex of amorphous cyclodextrin, or derivative thereof, and encapsulated gaseous molecule when produced by the method of the second aspect.

Preferably, the amorphous cyclodextrin is α-cyclodextrin and the encapsulated gaseous molecule is ethylene.

According to a fourth aspect of the invention there is provided a fruit ripening composition comprising an effective amount of an inclusion complex of amorphous cyclodextrin, or derivative thereof, and encapsulated gaseous molecule of the first or third aspect.

The fruit ripening composition may further comprise an amount of an inclusion complex of crystalline cyclodextrin, or derivative thereof, and encapsulated gaseous molecule.

In a preferred embodiment, the inclusion complex of crystalline cyclodextrin, or derivative thereof, and encapsulated gaseous molecule is an inclusion complex of crystalline α-cyclodextrin with encapsulated ethylene.

Preferably, the ratio of amorphous to crystalline inclusion complex is between about 1:9 to 9:1.

The inclusion complex of crystalline cyclodextrin, or derivative thereof, and encapsulated gaseous molecule may be formed by solubilising a crystalline cyclodextrin and exposing the solution to the gaseous molecule under pressure to cause the precipitation of the inclusion complex of crystalline cyclodextrin and encapsulated gaseous molecule.

Alternatively, the inclusion complex of crystalline cyclodextrin, or derivative thereof, and encapsulated, gaseous molecule may be formed by exposing the inclusion complex of amorphous cyclodextrin, or derivative thereof, and encapsulated gaseous molecule of the first or third aspect to moisture and effecting its conversion to the crystalline form.

Suitably, the exposure to moisture occurs under an atmosphere of ethylene with optional heating to dissolve and subsequently crystallise out the crystalline form.

The fruit ripening composition may comprise an amount of a deliquescent salt.

The deliquescent salt may be selected from the group consisting of calcium chloride, magnesium chloride, zinc chloride, potassium carbonate, potassium phosphate, ferric ammonium citrate, potassium hydroxide, and sodium hydroxide.

A fifth aspect of the invention resides in a method of ripening a fruit including the step of exposing the fruit to an effective amount of an inclusion complex of amorphous cyclodextrin, or derivative thereof, and encapsulated gaseous molecule of the first or third aspect, or the fruit ripening composition of the fourth aspect.

In one embodiment, the step of exposing the fruit to the inclusion complex of amorphous cyclodextrin, or derivative thereof, and encapsulated gaseous molecule, or the fruit ripening composition, occurs while the fruit is in transit.

The exposure may occur via a controlled release device.

The exposure of the fruit to the inclusion complex of amorphous cyclodextrin, or derivative thereof, and encapsulated gaseous molecule, or the fruit ripening composition, does not require solubilisation or partial dissolution of the inclusion complex to release the encapsulated gaseous molecule and so cause the fruit ripen.

The exposure of the fruit to the inclusion complex of amorphous cyclodextrin and encapsulated gaseous molecule, or the fruit ripening composition, may occur at a temperature range of about 10 to 20° C.

A sixth aspect of the invention resides in a controlled release device comprising:
(a) a container body defining a cavity suitable for containment of an inclusion complex of amorphous cyclodextrin, or derivative thereof, and encapsulated gaseous molecule; and
(b) a release aperture for the release of the gaseous molecule from the cavity.

In one embodiment the release aperture may be opened and closed by a manually removed sealing component or a pressure release valve.

The container body may be a gas tight flexible bag.

A seventh aspect of the invention resides in a fruit ripening system comprising:
(a) a controlled release device; and
(b) an inclusion complex of amorphous cyclodextrin, or derivative thereof, and encapsulated gaseous molecule located within the controlled release device.

The controlled release device may be as described for the sixth aspect and the inclusion complex is that of the first or third aspects, or the fruit ripening composition of the fourth aspect.

In an eighth aspect, the invention may extend to use of a controlled release device to maintain a gaseous molecule in an inclusion complex with amorphous cyclodextrin, or derivative thereof.

In a ninth aspect, the invention resides in a method of producing an inclusion complex of crystalline α-cyclodextrin, or derivative thereof, and encapsulated ethylene including the steps of:
(a) providing a solution of α-cyclodextrin, or derivative thereof;
(b) actively removing the solvent from the solution of α-cyclodextrin, or derivative thereof, to form a solid amorphous α-cyclodextrin, or derivative thereof, powder;
(c) exposing the solid amorphous α-cyclodextrin, or derivative thereof, powder to ethylene to form an inclusion complex of amorphous α-cyclodextrin, or derivative thereof; and
(d) contacting the inclusion complex of amorphous α-cyclodextrin, or derivative thereof, with water,
to thereby produce the inclusion complex of crystalline α-cyclodextrin, or derivative thereof.

The various features and embodiments of the present invention, referred to in individual sections above apply, as appropriate, to other sections, mutatis mutandis. Consequently features specified in one section may be combined with features specified in other sections as appropriate.

Further features and advantages of the present invention will become apparent from the following detailed description.

BRIEF DESCRIPTION OF THE DRAWINGS

In order that the invention may be readily understood and put into practical effect, preferred embodiments will now be described by way of example with reference to the accompanying figures wherein.

DETAILED DESCRIPTION OF THE DRAWINGS

Figure 1:
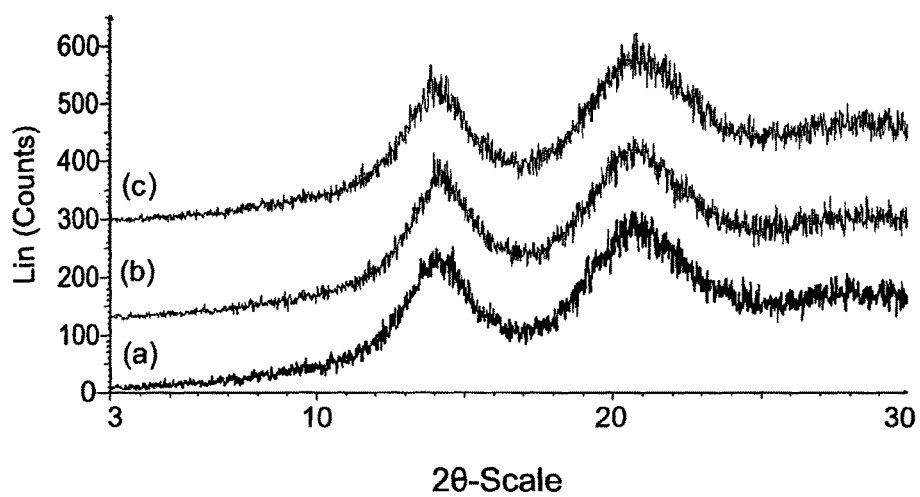
FIG. 1 is an X-ray diffraction analysis (XRD) of (a) pure amorphous α-CD; (b) amorphous α-CD with encapsulated ethylene and (c) moistened amorphous α-CD with encapsulated ethylene.

The present invention is predicated, at least in part, on the finding that an inclusion complex of α-cyclodextrin (α-CD) and encapsulated ethylene can be formed in a more effective and efficient manner if the α-CD is in an amorphous form. Particularly, it has been shown that when a solution of α-CD is spray dried to form a powdered α-CD with an amorphous molecular structure the ethylene gas can subsequently be directly incorporated into the solid α-CD powder in a shorter time period and in considerably higher yield than can be achieved using other methods.

In this patent specification, adjectives such as first and second, left and right, front and back, top and bottom, etc., are used solely to define one element or method step from another element or method step without necessarily requiring a specific relative position or sequence that is described by the adjectives. The terms 'comprises', 'comprising', 'includes', 'including', or similar terms are intended to mean a non-exclusive inclusion, such that a method, system or apparatus that comprises a list of elements does not include those elements solely, but may well include other elements not listed.

Unless defined otherwise, all technical and scientific terms used herein have the same meaning as would be commonly understood by those of ordinary skill in the art to which this invention belongs.

As used herein, the term "inclusion complex" refers generally to a complex in which a host molecule defines a cavity in which a guest molecule can be accommodated. The guest molecule is not covalently bonded and so can be released. Specifically, the term "inclusion complexes of the invention" is used herein to refer to inclusion complexes formed as described in the experimental section being those in which ethylene, carbon dioxide or another gaseous molecule is encapsulated within an amorphous cyclodextrin or simple derivative thereof. Preferably, the cyclodextrin is α-cyclodextrin, or a derivative thereof, and the gaseous molecule is ethylene.

The term "amorphous", as used herein, refers to any cyclodextrin or a simple derivative thereof which does not have a crystalline molecular structure i.e. wherein a disordered structure is present. The amorphous form may be achieved by actively and rapidly removing solvent from a solution of the cyclodextrin, or derivative thereof, rather than allowing the crystalline form to come out of solution. Preferably, the amorphous form is achieved through a spray drying process. A preferred amorphous cyclodextrin is amorphous α-cyclodextrin.

The terms "fruit ripening" and "ripening a fruit", as used herein, refers to a change in the color, firmness and/or sugar content of the fruit indicating that the fruit is at least progressing towards a ripened state. The fruit may not achieve full ripeness during exposure to the inclusion complexes of the invention but the ripening process will have been triggered such that at least partial ripening is observed.

In a first aspect of the invention, there is provided an inclusion complex of an amorphous cyclodextrin, or derivative thereof, and encapsulated gaseous molecule.

The amorphous cyclodextrin may be α-, β- or γ-cyclodextrin or alkylated, hydroxylated or sulfonated derivatives thereof. The α-, β- and γ-cyclodextrins are naturally occurring CDs having 6, 7 and 8 anhydroglucose units in the ring structure, respectively.

Preferably, the amorphous cyclodextrin is amorphous α-cyclodextrin or an alkylated, hydroxylated or sulfonated derivative thereof. Naturally occurring α-CD is a six-membered α-1,4-linked cyclic oligomer of D-glucose and is generally described as taking the form of a shallow truncated cone. The α-CD is the smallest CD being approximately 470-530 μm in diameter and presents a hydrophobic cavity.

The gaseous molecule encapsulated within the amorphous cyclodextrin, or derivative thereof, may be a small molecule of less than 6 non-hydrogen atoms.

Preferably, the gaseous molecule is selected from the group consisting of ethylene, methane, ethane, propane, propylene, butylene, 1-methylcyclopropene, carbon dioxide and nitrous oxide.

Most preferably, the gaseous molecule is ethylene.

Figure 10:
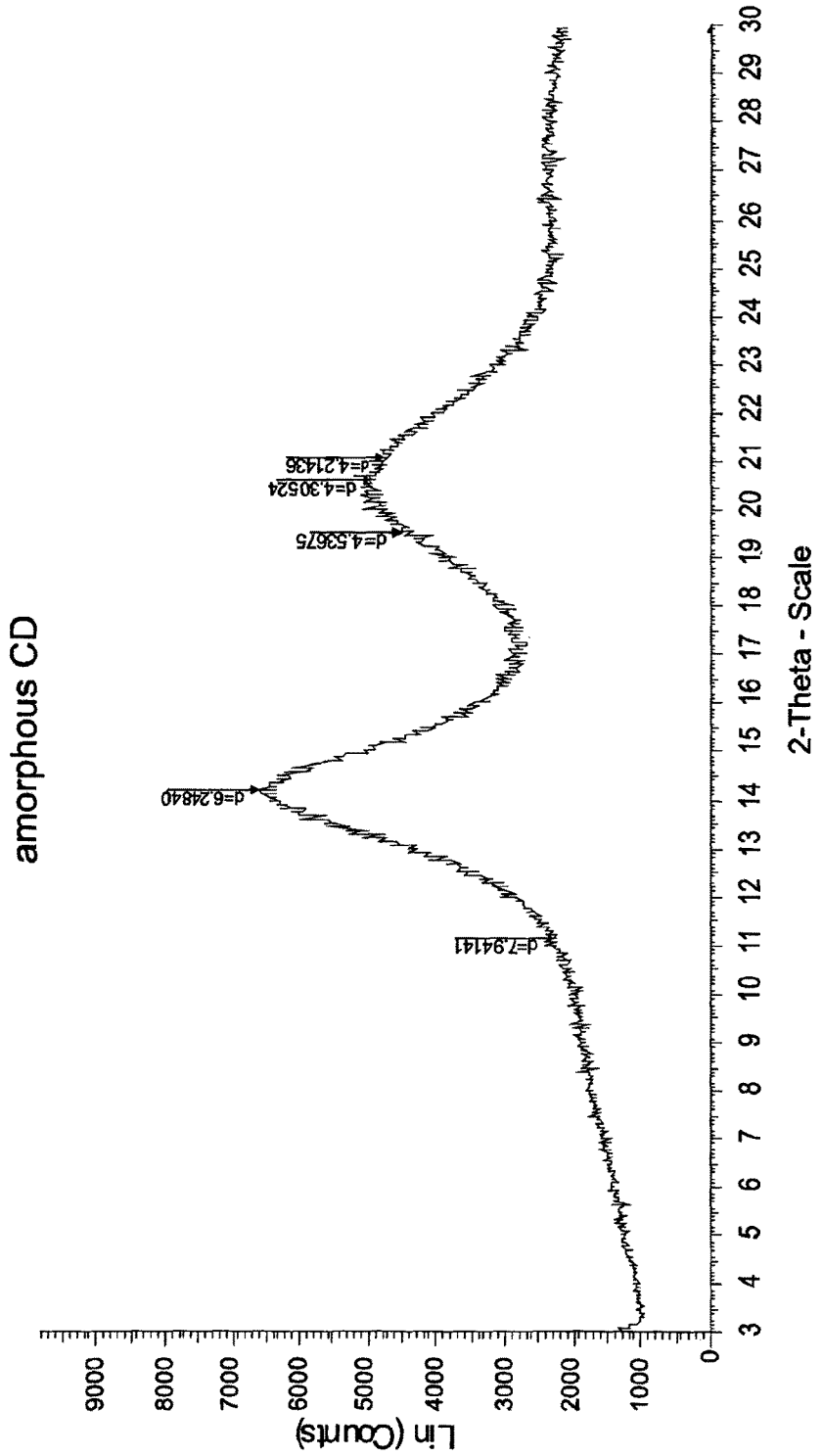
FIG. 10 is an X-ray diffraction analysis (XRD) of pure amorphous α-CD formed by a process as described herein.

An inclusion complex of amorphous α-cyclodextrin and encapsulated ethylene may be defined by the XRD data as shown in FIG. 1, trace (b). FIG. 1 is an XRD analysis of (a) pure amorphous α-CD prior to its exposure to ethylene; (b) amorphous α-CD with encapsulated ethylene as an inclusion complex (1.0 MPa, 48 h) and (c) moistened amorphous α-CD with encapsulated ethylene (0.2 MPa, 96 h). Moistening of the complex was carried out in an attempt to crystallise the amorphous complex to assess the ensuing change in release rate of the ethylene gas as the crystalline structure will hold on to the ethylene more strongly than the amorphous complex. The amorphous α-cyclodextrin itself i.e. without encapsulated ethylene, may be defined by the XRD data shown in FIG. 10.

The inclusion complex of amorphous α-cyclodextrin and encapsulated ethylene may comprise at least 0.1, 0.3, 0.5 or 0.7 moles of ethylene per mole of α-cyclodextrin. Preferably, the inclusion complex comprises at least 0.8, more preferably at least 0.85, even more preferably at least 0.90 and still more preferably at least 0.95 moles of ethylene per mole of α-cyclodextrin. It is an advantage of the present invention that inclusion complexes approaching a 1:1 ratio (moles of ethylene:mole α-CD) can be formed by simple exposure of the powdered solid α-CD to ethylene under pressure.

Figure 2:
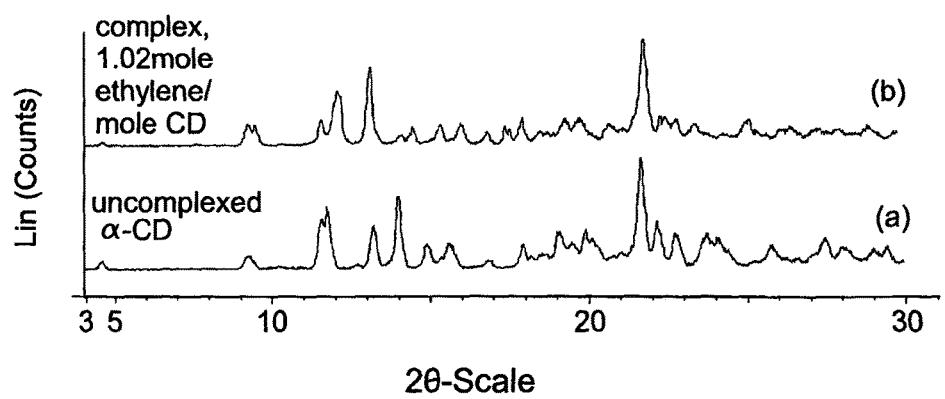
FIG. 2 is an XRD analysis of (a) pure crystalline α-CD; (b) crystalline α-CD with encapsulated ethylene.

FIG. 2 is an XRD analysis of: (a) crystalline α-CD; and (b) an ethylene-crystalline α-CD inclusion complex formed at 1.0 MPa after 48 h exposure to ethylene. This figure confirms the crystalline structure of the inclusion complex when made by a liquid encapsulation process such as is described in the literature. The differences between the XRD traces of FIGS. 1 and 2 indicate the difference in structure of the amorphous and crystalline forms of the α-CD used.

Figure 3:
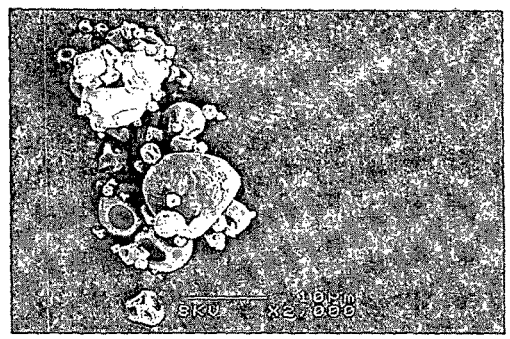
FIG. 3 is a scanning electron micrograph (SEM) of pure amorphous α-CD.
Figure 4:
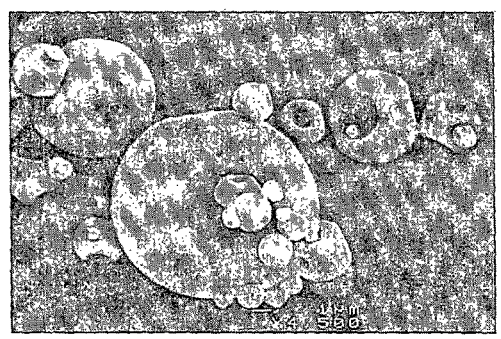
FIG. 4 is an SEM of an inclusion complex of amorphous α-CD with encapsulated ethylene.
Figure 5:
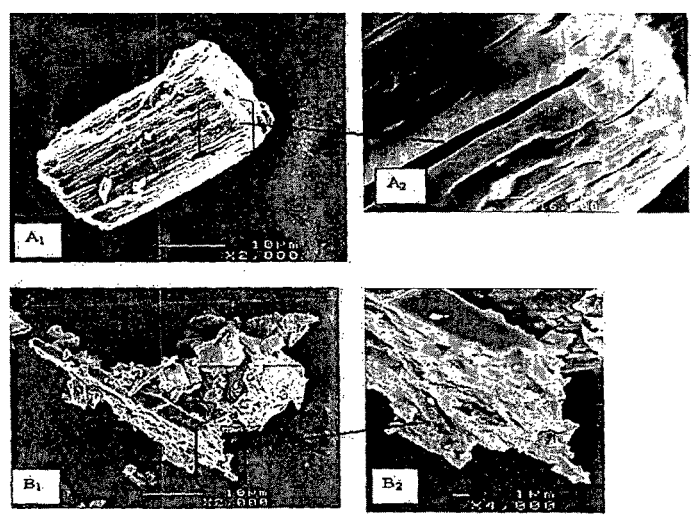
FIG. 5 is a series of SEM scans of: $A_1$ and $A_2$ pure crystalline α-CD and, $B_1$ and $B_2$, its inclusion complex with ethylene as formed in solution with precipitation of the inclusion complex crystals.

FIGS. 3 to 5 also assist in characterising the amorphous α-CD and differentiating it from crystalline α-CD both in the pure and ethylene inclusion complex states. FIG. 3 shows the amorphous α-CD which is obtained after spray drying of an α-CD aqueous solution while FIG. 4 shows the same amorphous α-CD after it has been contacted, in its dry state, with ethylene to form an inclusion complex. FIG. 5 shows, in images $A_1$ and $A_2$, pure crystalline α-CD and, in images $B_1$ and $B_2$, its inclusion complex with ethylene as formed in solution with precipitation of the inclusion complex crystals. The difference in those images of FIG. 5 and those of FIGS. 3 and 4 are striking thereby confirming that the amorphous form of cyclodextrin used with the present complexes is structurally quite different to the crystalline form.

Figure 6:
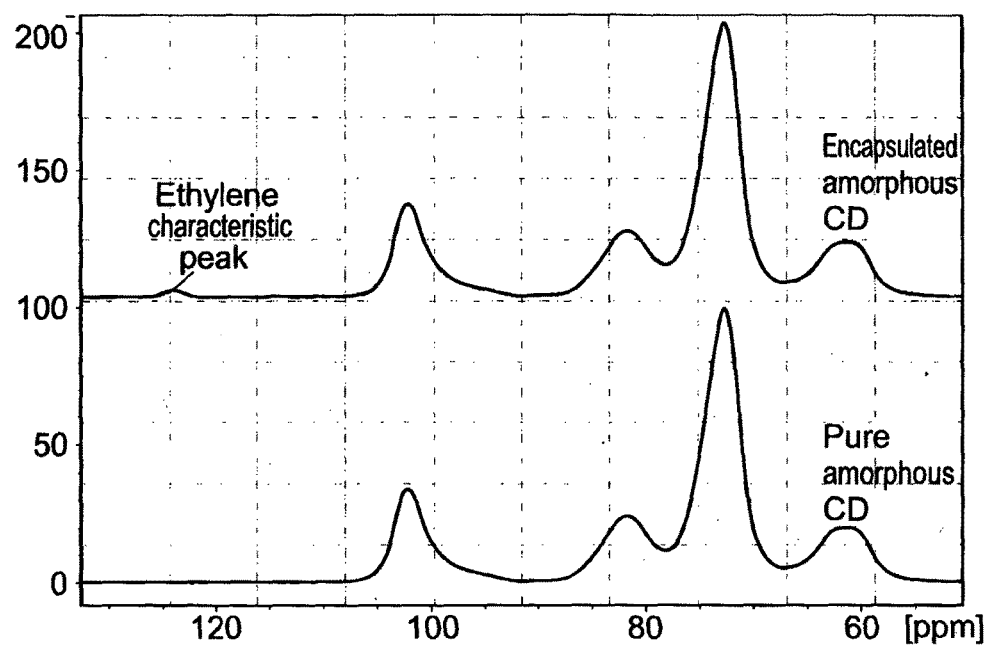
FIG. 6 is a CP-MS $^{13}$C NMR spectra of pure amorphous α-CD and 'encapsulated amorphous CD' being an inclusion complex of the present invention.
Figure 11:
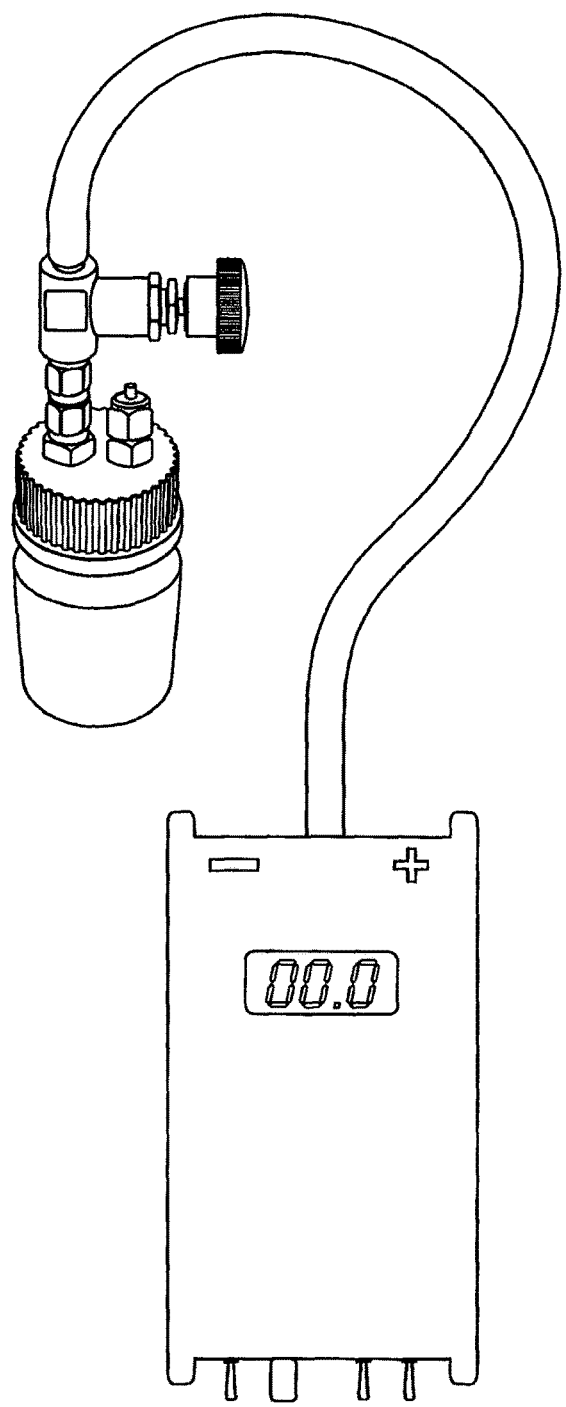
FIG. 11 is a depiction of one experimental arrangement to measure the head space pressure due to ethylene release from amorphous α-CD.

The inclusion complex of amorphous α-CD with encapsulated ethylene was also characterised by NMR, as shown in FIG. 6. The presence in the uppermost trace of the characteristic ethylene peak can clearly be seen thereby indicating its successful inclusion. The presence of ethylene in the amorphous α-CD can also be demonstrated, and quantified, by placing a portion of the inclusion complex in a vessel which is then sealed (as shown in FIG. 11). The amorphous α-CD will eventually release its ethylene although this is preferably sped up and encouraged to go to completion by having an amount of water in the vial sufficient to dissolve the complex. The headspace in the vial will then contain all of the formerly encapsulated ethylene and this can be sampled using gas chromatographic analysis and compared with an ethylene standard to thereby quantify the amount of ethylene which was contained within the inclusion complex.

Further characterisation data for both the amorphous α-CD and amorphous α-CD inclusion complex formed with encapsulated ethylene and carbon dioxide is presented in the experimental section.

Although the embodiments exemplified herein relate to α-CD, it will be appreciated that other cyclodextrins may be useful. A wide variety of cyclodextrin derivatives are known in the art and are commercially available. Derivatives of the cyclodextrin suitable for use herein may include alkyl, alkoxy, hydroxyalkyl, sulfonated and heteroalkyl derivatives. Derivatisation may be by reaction at one of the free hydroxyl groups of the cyclodextrin.

According to a second aspect of the invention there is provided a method of producing an inclusion complex of amorphous cyclodextrin, or derivative thereof, and encapsulated gaseous molecule including the steps of:

(a) providing a solution of a cyclodextrin, or derivative thereof;

(b) actively removing the solvent from the solution of cyclodextrin, or derivative thereof, to form a solid amorphous cyclodextrin, or derivative thereof, powder; and (c) exposing the solid amorphous cyclodextrin, or derivative thereof, powder to a gaseous molecule, to thereby produce the inclusion complex of amorphous cyclodextrin, or derivative thereof, and encapsulated gaseous molecule.

Suitable cyclodextrins and gaseous molecules will be as discussed for the first aspect. Particularly, it is preferred that the solid, dry amorphous cyclodextrin, or derivative thereof, is α-cyclodextrin and the encapsulated gaseous molecule is ethylene.

The solvent may be a polar, semi-polar or ionic solution.

Preferably, the solution of cyclodextrin is an aqueous solution. More preferably, the solvent is water. The water may contain ionic salts, including deliquescent salts, such as calcium chloride.

The step of actively removing the solvent may include the step of evaporating the solvent and/or spray drying and/or freeze drying the solution of α-cyclodextrin. The solvent may be removed under reduced pressure. A rotary evaporator or similar equipment may be suitable for removing the solvent under reduced pressure. Alternatively, simple evaporation of the solvent in a heated atmosphere may be sufficient.

The step of spray drying the solution of α-cyclodextrin may include the step of supplying the solution of α-cyclodextrin to an atomizer to atomize the solution into droplets.

The step of spray drying the solution of α-cyclodextrin may further include the step of drying the atomized droplets of solubilised α-cyclodextrin by exposing them to a drying gas.

Spray drying is a fast and efficient method of rapidly removing solvent to provide the desired amorphous α-cyclodextrin and so is a preferred step. It will be appreciated by one of skill in the art that other means of rapidly removing the solvent are available and may form suitable alternatives.

The temperature of the drying gas will vary depending on the nature of the solvent employed. So long as the temperature is sufficient to quickly evaporate the solvent then it may be useful. Suitably, the drying gas is heated to between 200° C. to 150° C. inlet temperature and between 60° C. to 90° C. outlet temperature. Preferably, the inlet temperature is about 180° C. and the outlet temperature is about 80° C.

Preferably, the amorphous cyclodextrin is substantially dry prior to exposure to the gaseous molecule.

The amorphous cyclodextrin powder may be exposed to the gaseous molecule in a closed gas tight environment.

Figure 7:
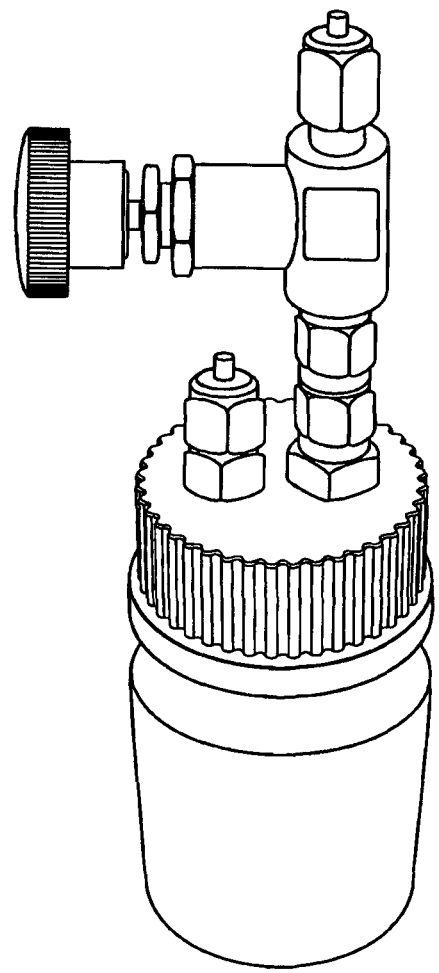
FIG. 7 is a depiction of one experimental arrangement to expose amorphous α-CD to ethylene and control its release therefrom.

The amorphous cyclodextrin powder may be exposed to the gaseous molecule under pressure. A suitable vessel for this process is shown in FIG. 7.

Suitably, the amorphous cyclodextrin powder is exposed to the gaseous molecule at a pressure between about 0.1 MPa to less than about 5 MPa, preferably between about 0.5 MPa to about 3 MPa, more preferably between about 1.0 MPa to about 2.0 MPa.

In one embodiment, the amorphous cyclodextrin powder is exposed to the gaseous molecule for a time of between 1 h to 120 h, preferably between about 5 h to about 96 h, more preferably between about 12 h to about 72 h, even more preferably between about 24 h to about 54 h.

In one embodiment, the method of the second aspect may be a method of producing a mixed inclusion complex of amorphous α-cyclodextrin and crystalline α-cyclodextrin, or derivatives thereof, and encapsulated ethylene including steps (a), (b) and (c), as described above, and further including the step of contacting the amorphous α-cyclodextrin with moisture to effect its conversion to the crystalline form.

There are a number of advantages to such a mixed inclusion complex composition. As shown in the experimental section, it has been found that the amorphous α-cyclodextrin with encapsulated ethylene can be converted to the crystalline form, at least to some extent, while maintaining a substantial portion of the ethylene within the inclusion complex. This has been found to produce a surprisingly stable complex whereby the ethylene can be maintained within the inclusion complex in a sealed container ready for use.

Due to the disordered structure of the amorphous α-cyclodextrin it is a relatively quick release form which can provide distinct advantages. However, to provide for both short and longer term release it has now been shown that simply contacting the amorphous α-cyclodextrin with encapsulated ethylene with moisture can effect the change of a portion of that complex into the crystalline form thereby instantly providing a sustained release form of the inclusion complex.

A third aspect of the invention resides in an inclusion complex of amorphous cyclodextrin, or derivative thereof, and encapsulated gaseous molecule when produced by the method of the second aspect.

The inclusion complex is as described for the first aspect.

Preferably, the amorphous cyclodextrin is α-cyclodextrin and the encapsulated gaseous molecule is ethylene.

The inclusion complex may be a mixed amorphous α-cyclodextrin/crystalline α-cyclodextrin both with encapsulated ethylene wherein the crystalline. α-cyclodextrin is produced by contacting the amorphous α-cyclodextrin with moisture.

Preferably, the amorphous α-cyclodextrin is contacted with moisture and the mixed inclusion complex located in a sealed container for subsequent use.

According to a fourth aspect of the invention there is provided a fruit ripening composition comprising an effective amount of an inclusion complex of amorphous cyclodextrin, or derivative thereof, and encapsulated gaseous molecule of the first or third aspect.

The fruit ripening composition may further comprise an amount of an inclusion complex of a crystalline cyclodextrin, or derivative thereof, and encapsulated gaseous molecule.

In a preferred embodiment, the inclusion complex of crystalline cyclodextrin, or derivative thereof, and encapsulated gaseous molecule is an inclusion complex of crystalline α-cyclodextrin with encapsulated ethylene. The amorphous cyclodextrin inclusion complex will be as described for the first aspect.

Preferably, the ratio of amorphous to crystalline inclusion complex is between about 1:9 to 9:1.

The inclusion complex of crystalline cyclodextrin, or derivative thereof, and encapsulated gaseous molecule may be formed by solubilising a crystalline cyclodextrin and exposing the solution to the gaseous molecule under pressure to cause the precipitation of the inclusion complex of crystalline cyclodextrin and encapsulated gaseous molecule.

However, in a preferred embodiment, the inclusion complex of crystalline α-cyclodextrin, or derivative thereof, and encapsulated ethylene is formed by exposing, the inclusion complex of amorphous α-cyclodextrin, or derivative thereof, and encapsulated ethylene of the first or third aspect to moisture and effecting its conversion to the crystalline form.

The conversion is as discussed in relation to the second and third aspects.

This mixed composition of crystalline and amorphous inclusion complexes of, preferably, ethylene in α-CD can provide advantages in use when ripening fruit. It has been found that the amorphous α-CD inclusion complex advantageously releases ethylene relatively rapidly by comparison to the crystalline equivalent. This is useful in quickly attaining an atmospheric concentration of around 10 ppm which is necessary for the initiation of fruit ripening. However, to maintain that level for a longer period of time, and as an alternative or addition to the controlled release of ethylene from a controlled release device containing the amorphous α-CD inclusion complex, it can be useful to include an amount of the crystalline form which will start to release its ethylene as the ethylene release from the amorphous inclusion complex is diminishing. Thus, a quick and sustained combined release composition is achieved.

The amorphous cyclodextrin with encapsulated gaseous molecule can be obtained in high yields but, as discussed has relatively fast release properties. If it is desired to take advantage of the high yields of the present approach but also to provide for a slow release form of inclusion complex then this conversion process provides the desired flexibility. It will be appreciated that even though the amorphous cyclodextrin temporarily goes into solution under an atmosphere of ethylene, or whatever the gaseous molecule may be, this is not a process of encapsulating ethylene while the cyclodextrin is in solution. Such a process requires relatively high pressures and extended time spans which may not be required for the amorphous to crystalline conversion process.

The fruit ripening composition may comprise an amount of a deliquescent salt.

The deliquescent salt may be selected from the group consisting of calcium chloride, magnesium chloride, zinc chloride, potassium carbonate, potassium phosphate, ferric ammonium citrate, potassium hydroxide, and sodium hydroxide. As shown in the experimental section, deliquescent salts may significantly increase the total amount of the gaseous molecule which is released from the inclusion complex. Their use may therefore assist in controlling the release rate and total release amount of the gaseous molecule from the complex.

The fruit ripening composition may further comprise an amount of moisture. The amount of moisture may be between 5 to 50% by weight of the inclusion complex in the composition. In one embodiment, the amount of moisture is between 10 to 40%, 15 to 30% or about 20%. The introduction of an amount of moisture may be useful in effecting a more rapid release of the ethylene from the amorphous α-CD inclusion complex.

A fifth aspect of the invention resides in a method of ripening a fruit including the step of exposing the fruit to an effective amount of the inclusion complex of amorphous cyclodextrin, or derivative thereof, and encapsulated gaseous molecule of the first or third aspect, or the fruit ripening composition of the fourth aspect.

Preferably, the step of exposing the fruit to the inclusion complex of amorphous cyclodextrin, or derivative thereof, and encapsulated gaseous molecule, or the fruit ripening composition, occurs while the fruit is in transit.

The exposure may occur via a controlled release device.

The exposure of the fruit to the inclusion complex of amorphous cyclodextrin, or derivative thereof, and encapsulated gaseous molecule, or the fruit ripening composition, does not require solubilisation or partial dissolution of the inclusion complex to release the encapsulated gaseous molecule and so cause the fruit ripen.

The exposure of the fruit to the inclusion complex of amorphous cyclodextrin and encapsulated gaseous molecule, or the fruit ripening composition, may occur at a temperature range of about 10 to 20° C.

The inclusion complex of amorphous cyclodextrin and encapsulated gaseous molecule will, in a highly preferred embodiment, be an inclusion complex of amorphous α-cyclodextrin and encapsulated ethylene. Other cyclodextrins and gaseous guest molecules, as described above, may be suitable.

The method may further include the step of controlling the moisture content of the inclusion complex to be between 5 to 50% by weight of the inclusion complex in the composition. In one embodiment, the amount of moisture is controlled to be between 10 to 40%, 15 to 30% or about 20%.

The method may further include the step of introducing a deliquescent salt to the inclusion complex to improve the total release of the gaseous molecule.

This aspect provides for an efficient means of ripening fruit quickly while in transit and without the need for an additional period of storage in a dedicated ripening room. Thus the time taken for the fruit to be ready for sale is reduced and the costs of ripening are also lowered significantly.

A sixth aspect of the invention resides in a controlled release device comprising:
(a) a container body defining a cavity suitable for containment of an inclusion complex of amorphous cyclodextrin, or derivative thereof, and encapsulated gaseous molecule; and
(b) a release aperture for the release of the gaseous molecule from the cavity.

In one embodiment the release aperture may be opened and closed by a manually removed sealing component or a pressure release valve.

The container body may be a gas tight flexible bag.

The manually removed sealing component may be a cap or similar component which results in exposure of the inclusion complex to the surrounding atmosphere. Alternatively, the container may be provided with a breakable seal or easy rip portion to open the container body.

Suitably, the manually removed sealing component or pressure release valve opens to provide a flow path from the cavity to the external environment when the ethylene pressure in the cavity reaches greater than atmospheric pressure.

Figure 8:
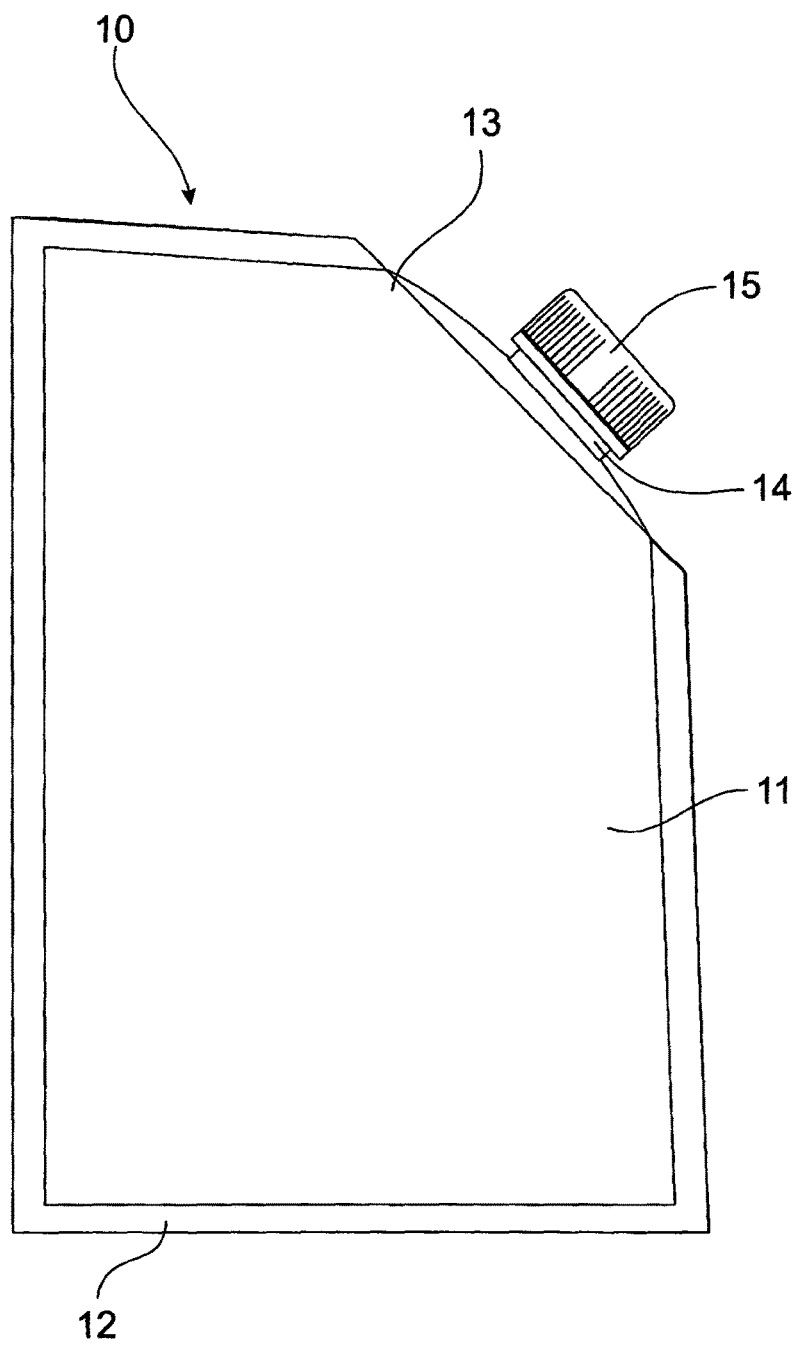
FIG. 8 is a representation of one embodiment of a controlled release device as described herein.
Figure 9:
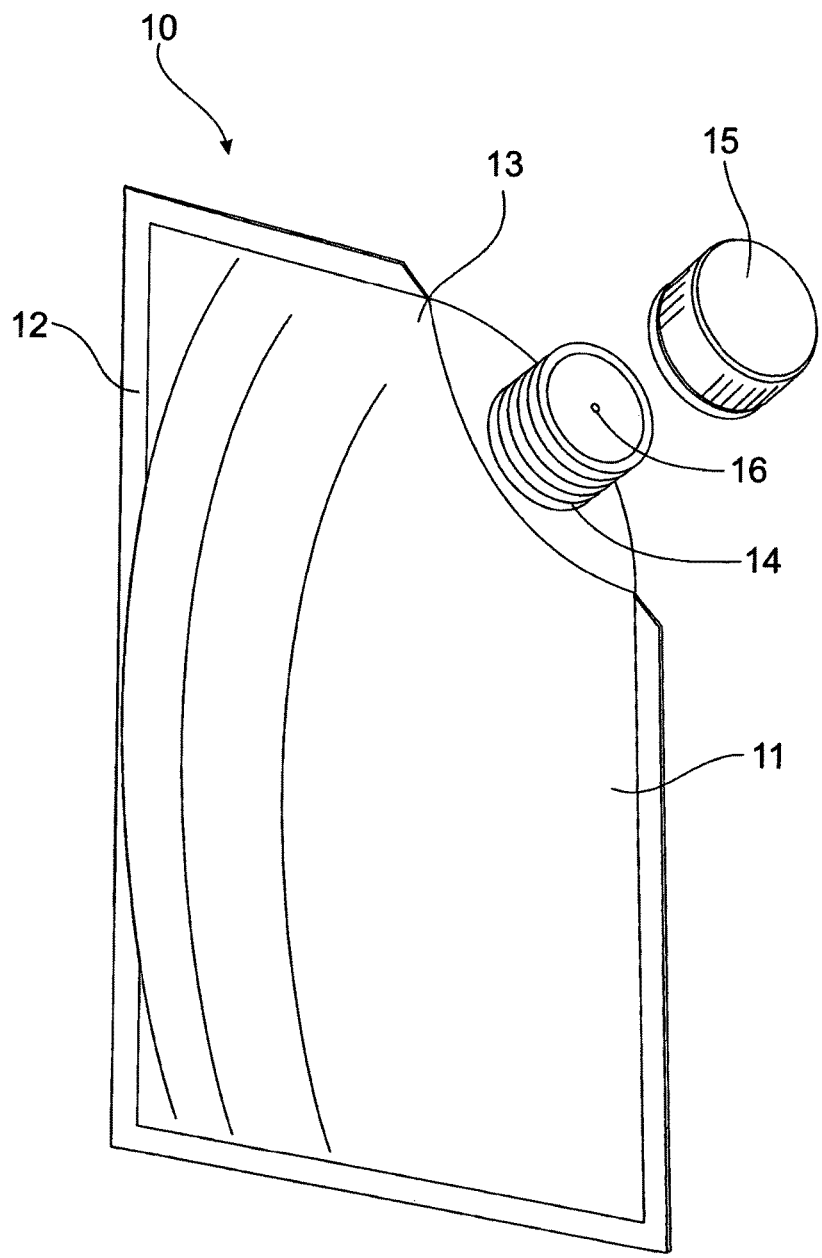
FIG. 9 is a perspective view of the controlled release device of FIG. 8 showing the cap removed.

FIG. 8 is a representation of one embodiment of a controlled release device 10 suitable for use with the inclusion complex of the invention and FIG. 9 is a perspective view of the controlled release device of FIG. 8 showing the cap removed. The controlled release device 10 has a container body in the form of a flexible foil bag 11 provided with a gas tight sealed portion 12 along its outer extent. A more rigid form of container would also be suitable and may be advantageous in some environments. The bag 11 has a cut away portion 13 from which a gas outlet 14 extends. The gas outlet 14 is closed with a cap 15. FIG. 9 shows that the gas outlet 14 is screw threaded to receive the cap 15 and also that it is provided with a release aperture 16. The release aperture 16 is continuous with the interior cavity of the bag 11 and so when an inclusion complex of the invention is contained within the bag any ethylene which is released can escape through the release aperture 16 to contact the fruit to be ripened. The cap 15 may make a gas tight seat with the gas outlet 14 such that ethylene release will occur only after removal of the cap 15. Alternatively, the release aperture 16 may be initially covered with foil and will require puncturing before ethylene release can occur. This will help ensure release does not occur accidentally.

A seventh aspect of the invention resides in a fruit ripening system comprising:
(a) a controlled release device; and
(b) an inclusion complex of amorphous cyclodextrin, or derivative thereof, and encapsulated gaseous molecule located within the controlled release device.

The controlled release device is as described for the sixth aspect and the inclusion complex is that of the first or third aspects, or the fruit ripening composition of the fourth aspect.

In an eighth aspect, the invention may extend to use of a controlled release device to maintain a gaseous molecule in an inclusion complex with amorphous cyclodextrin, or derivative thereof.

The gaseous molecule may be maintained within the inclusion complex based, upon pressure control or otherwise control of the molar ratios of the components in the inclusion complex and gaseous phase.

EXPERIMENTAL

Materials

Crystalline α-cyclodextrin (99% purity) was obtained from Ensuiko Sugar Refining Co. Ltd (available from Consortium für Elektrochemische Industrie GmbH, München, Germany, or Wacker Biochem Group). Ethylene was supplied in a gas cylinder by BOC (BOC, Australia). All solvents, chemicals were of analytical grade.

Preparation of Amorphous α-Cyclodextrin by Spray Drying

In a first production round (Batch 1) a solution of α-CD (7% w/w) was prepared by dissolving commercial crystalline α-CD powder in Milli-Q deionised water. The solution was dried using a Büchi Mini Spray Drier B-290 (Büchi Labortechnik AG, Postfach, Switzerland) at inlet/outlet air temperatures of 170° C./70° C. A spray dried amorphous α-CD powder resulted and this was stored in desiccators with phosphorous pentoxide, as a desiccant, for future use. This sample was used to produce the XRDs of FIG. 1.

In a second production round (Batch 2) ten liters of saturated α-CD' solution (10% w/w, at 25° C.) was first prepared by dissolution of crystalline α-CD powder in Milli-Q deionised water. The inlet air temperature of the spray dryer was adjusted to approx. 180° C. and the heat/fan was switched on. The inlet air speed fan was then adjusted slowly to level 4. The atomizer compressed air inlet was set at 4 bars. When the outlet temperature reached around 70° C. at the exit of the cyclone the compressed air supply to the atomizer was switched on and started pumping water into the atomizer slowly. The inlet temperature and outlet temperature were then set at 180/80° C. Tin/Tout. The prepared ten liters of saturated α-CD solution (10% w/w, at 25° C.) was introduced. Once the drying was complete, the powder was collected from the cyclone. An XRD of the as formed Batch 2 α-CD is shown as FIG. 10.

Encapsulation of Ethylene into Amorphous α-Cyclodextrin

The Batch 1 dried amorphous α-CD powder was then transferred into a vessel which was sealed and ethylene gas then introduced under controlled pressure. FIG. 7 indicates the nature of a suitable experimental set up for exposing the amorphous α-CD to ethylene and similar equipment is used in FIG. 11 along with a sensor for measuring the release of ethylene into the vessel head space based on pressure changes. Table 1 shows the amount of ethylene introduced into the amorphous α-CD on a mole/mole basis.

TABLE 1

Ethylene concentration (mole/mole CD) in amorphous α-CD complex (2 replicates).

| Time, hours | 0.5 MPa | | 1.0 MPa | | 1.5 MPa | |
|---|---|---|---|---|---|---|
| | Mean | SD | Mean | SD | Mean | SD |
| 24 | 0.319 | 0.005 | 0.454 | 0.063 | 0.508 | 0.031 |
| 72 | 0.502 | | 0.735 | | 0.793 | |
| 96 | 0.632 | 0.049 | 0.790 | 0.109 | 0.857 | 0.073 |
| 120 | 0.667 | 0.054 | 0.803 | 0.043 | 0.876 | 0.053 |

The same encapsulation experiment was performed on dry commercial crystalline α-CD, for comparison's sake. The results are shown in table 2.

TABLE 2

Ethylene concentration (mole/mole CD) in crystalline α-CD.

| | Pressure (MPa) | |
|---|---|---|
| Time (hours) | 1.0 | 1.5 |
| 24 | 0.005193 | 0.010206 |
| 48 | 0.007444 | 0.013660 |

The Batch 2 dried amorphous α-CD powder was added into a multi-layered plastic container of 41.5 mm in diameter and 107.5 mm in depth. The container was then placed inside the chamber of a pressure vessel (52 mm in diameter and 220 mm in depth). Ethylene gas was flushed into the vessel at set pressures and for predetermined times. Specifically, due to the success of the Batch 1 experiment at this pressure, the powder was exposed to ethylene at 1.5 MPa for up to 48 h.

To assist in determining the required time for ethylene exposure to achieve optimal encapsulation samples of the exposed α-CD powder were taken at 1 h, 2 h, 4 h, 6 h, 12 h, 24 h and 48 h (25° C.). Ethylene in the amorphous α-CD powder was quantified by gas chromatography (GC) using headspace analysis by dissolving the α-CD powder in water. Two milligrams of the powder was weighed out and transferred into a 16.5 mL amber airtight-screw-top vial (Supelco, Bellefonte, USA) and fitted with 3 mm thick PTFE/Silicone septa (CRS, Louisville, USA). One milliliter of distilled water was added into the vial. Water was kept separated from the α-CD sample inside the vial until the cap was tightly sealed. The vial was then gently shaken on an IKA KS 130 basic shaker (IKA, Staufen, Germany) at 720 rpm for 5 min for thorough dissolution of the α-CD powder. The headspace was subsequently sampled for GC analysis. The peak area of the sampled ethylene was recorded and converted into an ethylene concentration based on an ethylene standard (BOC, NSW, Australia).

The inclusion ratio of ethylene to α-CD in the inclusion complex was calculated on a wet basis and is presented as a ratio of encapsulated ethylene to α-CD. Ethylene in the inclusion complex included the ethylene in headspace and the dissolved ethylene in water. Dissolved ethylene in water was estimated based on the theoretical values from Henry's Law.

Figure 12:
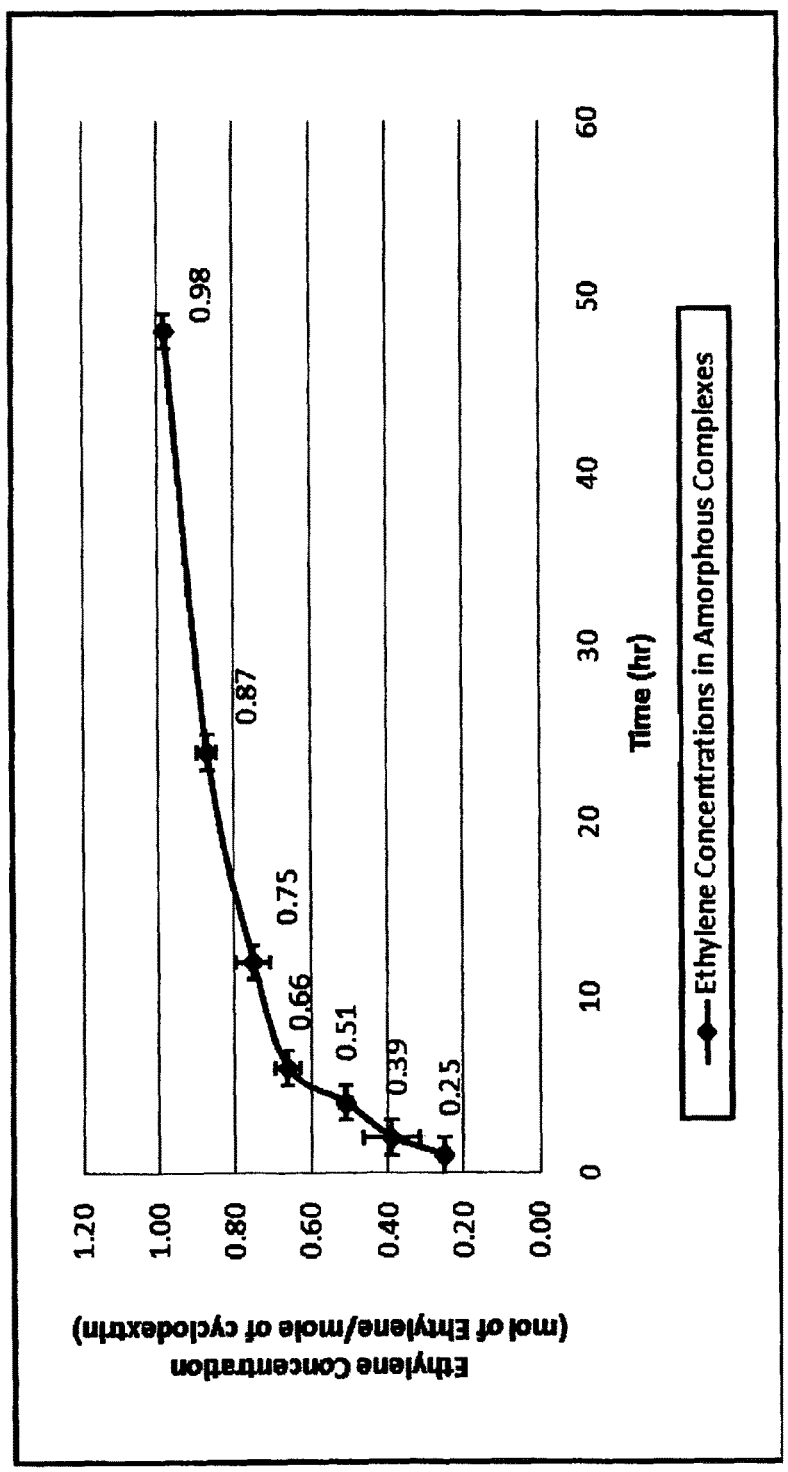
FIG. 12 is a graphical representation of the ethylene concentration encapsulated within the amorphous α-CD with time.

For the actual ethylene analysis, the GC (Shimadzu 17A, Tokyo, Japan) was fitted with a stainless steel column (3 m×1.2 mm) packed with Porapak N (100-120 mesh) (Water, Milford, Mass.). It was operated with helium at 40 mL/min as the carrier gas, at 90° C. oven temperature and 150° C. detector (FID), and 105° C. injector Cap 1 temperature. Five hundred microliters of headspace gas was manually taken using an air-tight syringe (SGE Pty, Ltd., Ringwood, Australia) and injected into the GC. Ethylene was quantified based on an ethylene standard (BOC, Australia) and CLASS-GC10 Version 1.6 software (Shimadzu, Tokyo, Japan). The results of this optimisation experiment are shown in table 3, below, and graphically in FIG. 12.

TABLE 3

The determination of time required for effective encapsulation of ethylene at 25° C. ± 1° C.

| Time of Encapsulation (hours) | Ethylene concentrations (mol/mole of cyclodextrin) |
|---|---|
| 1 | 0.25 |
| 2 | 0.39 |
| 4 | 0.51 |
| 6 | 0.66 |
| 12 | 0.75 |
| 24 | 0.87 |
| 48 | 0.98 |

These experiments clearly show that up to 0.876 (Batch 1 experiments) and 0.98 (Batch 2) moles of ethylene per mole of amorphous α-CD can be encapsulated under the conditions shown. The difference in batches can be attributed to an improvement in the quality of product in Batch 2 due to optimised process conditions. These results demonstrate a commercially advantageous level of ethylene within the inclusion complex, in fact approaching 1:1 ethylene to amorphous α-CD molar ratio, and certainly sufficient to induce ripening in fruits when the inclusion complex is present in relatively small amounts. Further, a close to maximal level of 0.87 mole ethylene/mole amorphous α-CD can be obtained in only 24 hours.

The results for the dry crystalline α-CD show that it is unsuccessful as an approach for encapsulation of useful amounts of ethylene. This is why previous attempts at encapsulation within cyclodextrins have focussed on encapsulation of a gaseous molecule when the cyclodextrin is in solution. Conventional thinking has thus been that cyclodextrins in their solid state are not efficient at encapsulating guest molecules. It will be appreciated then that the present solution whereby ethylene gas is successfully encapsulated into a dry powdered amorphous α-CD could not reasonably have been predicted as being a successful approach.

It will be appreciated that levels of close to 1.0 mole ethylene/mole amorphous α-CD obtained herein are representative of the entire amount of amorphous α-CD to which the gaseous ethylene was exposed. That is, the yield of inclusion complex demonstrating the approximately 0.98 mole ethylene/mole amorphous α-CD, under the recited conditions, is substantially 100%.

Previous attempts by others using crystalline α-CD solutions into which the ethylene is loaded have produced good levels of encapsulation but resulted in a low yield of product. This requires additional effort in recycling still dissolved α-CD for further experiments and is an expense in terms of wasted processing space. This wasted processing space is due to the relatively large volume of solvent which must be used to dissolve working amounts of the crystalline α-CD. For example, in 10 liters of water it would likely be possible to dissolve approximately 1 Kg of crystalline α-CD and perhaps only 20-30% of this would then be obtained as an inclusion complex precipitated product (200-300 g). Since the present method of encapsulation employs a solid dry powdered α-CD for incorporation of the ethylene the use of processing space is significantly more efficient.

The Effects of Moisture on the Amorphous α-CD

Figure 13:
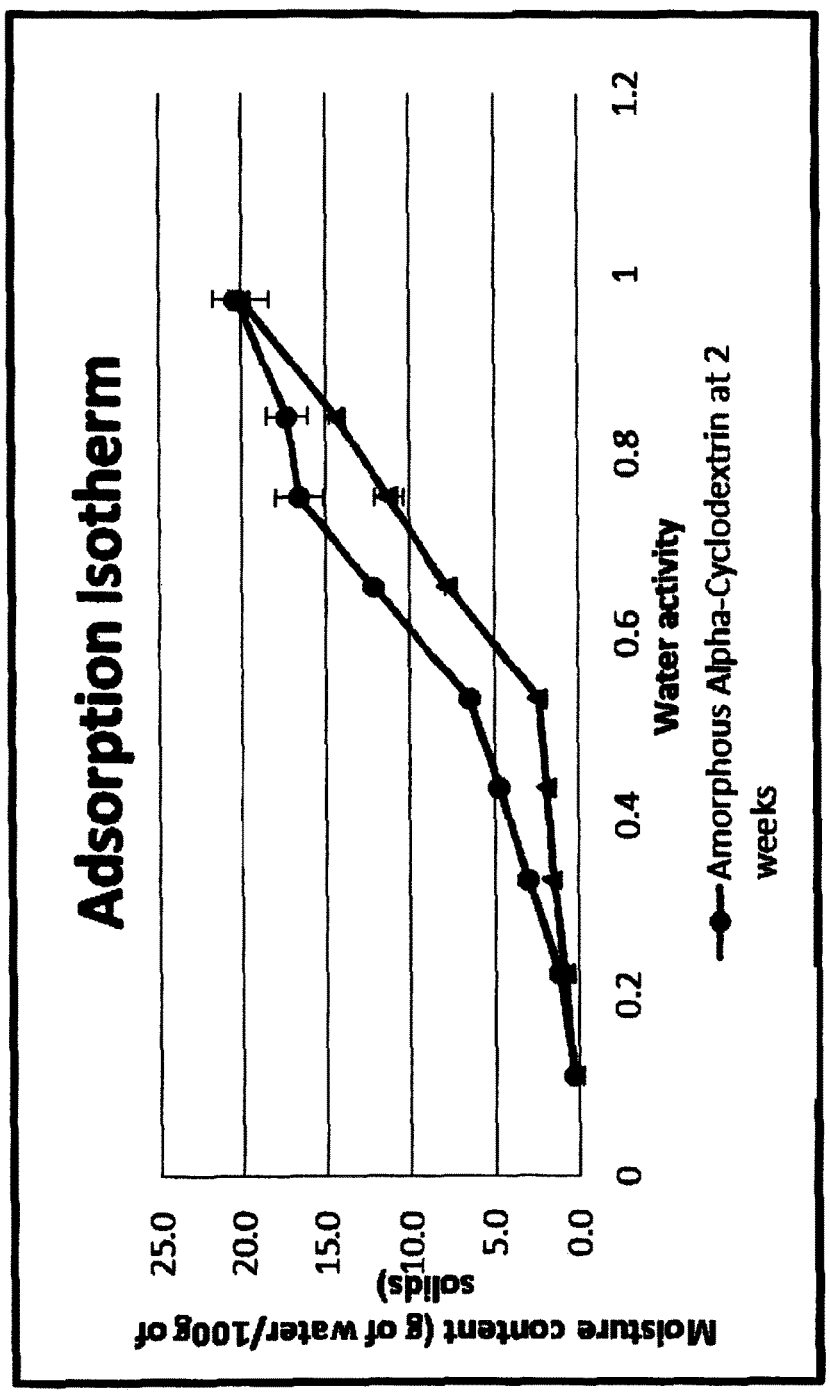
FIG. 13 is an adsorption isotherm of the water activity of the amorphous α-CD at varying moisture contents.
Figure 14:
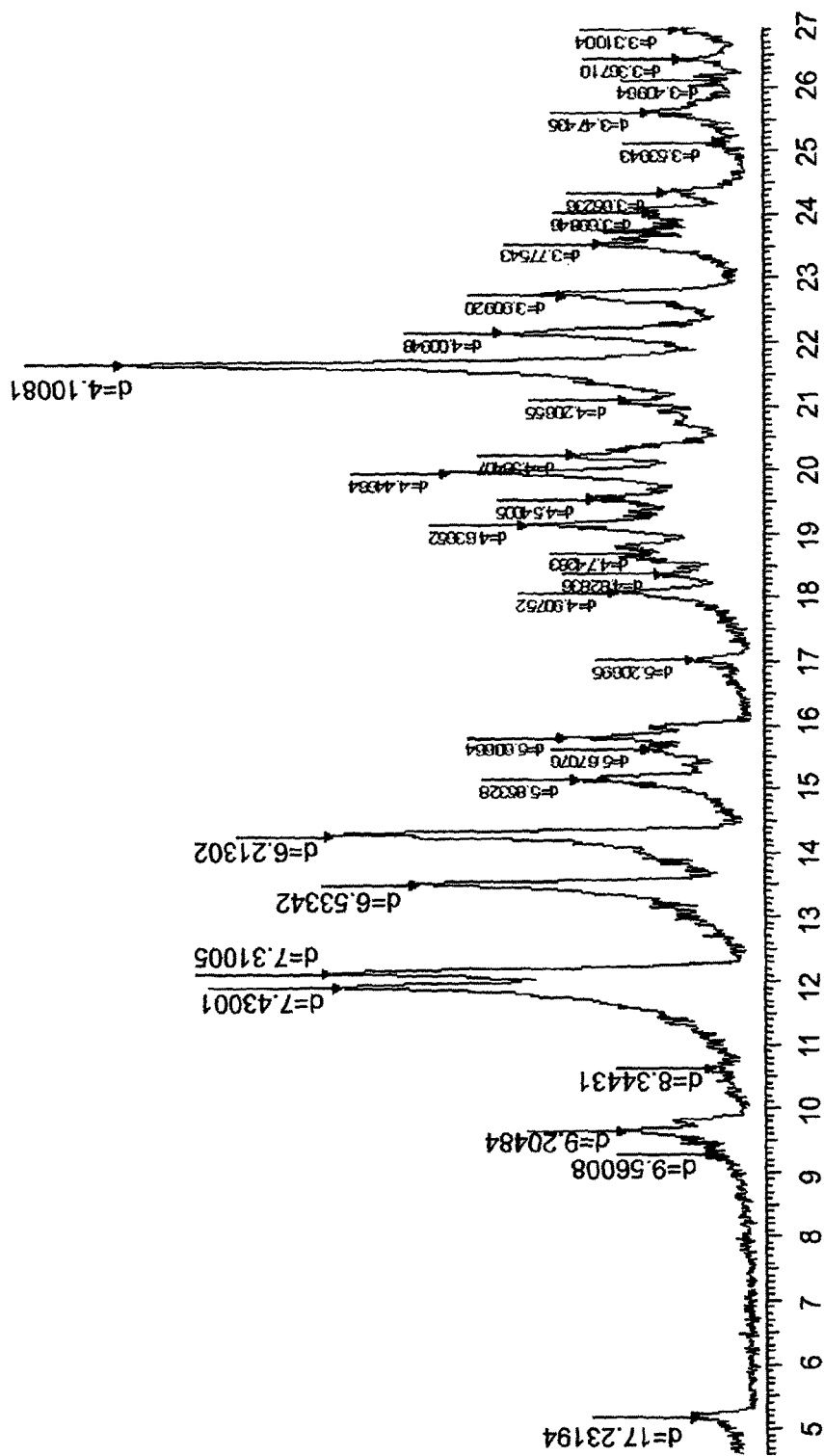
FIG. 14 is an XRD of the amorphous α-CD after exposure to 20% moisture content.
Figure 15:
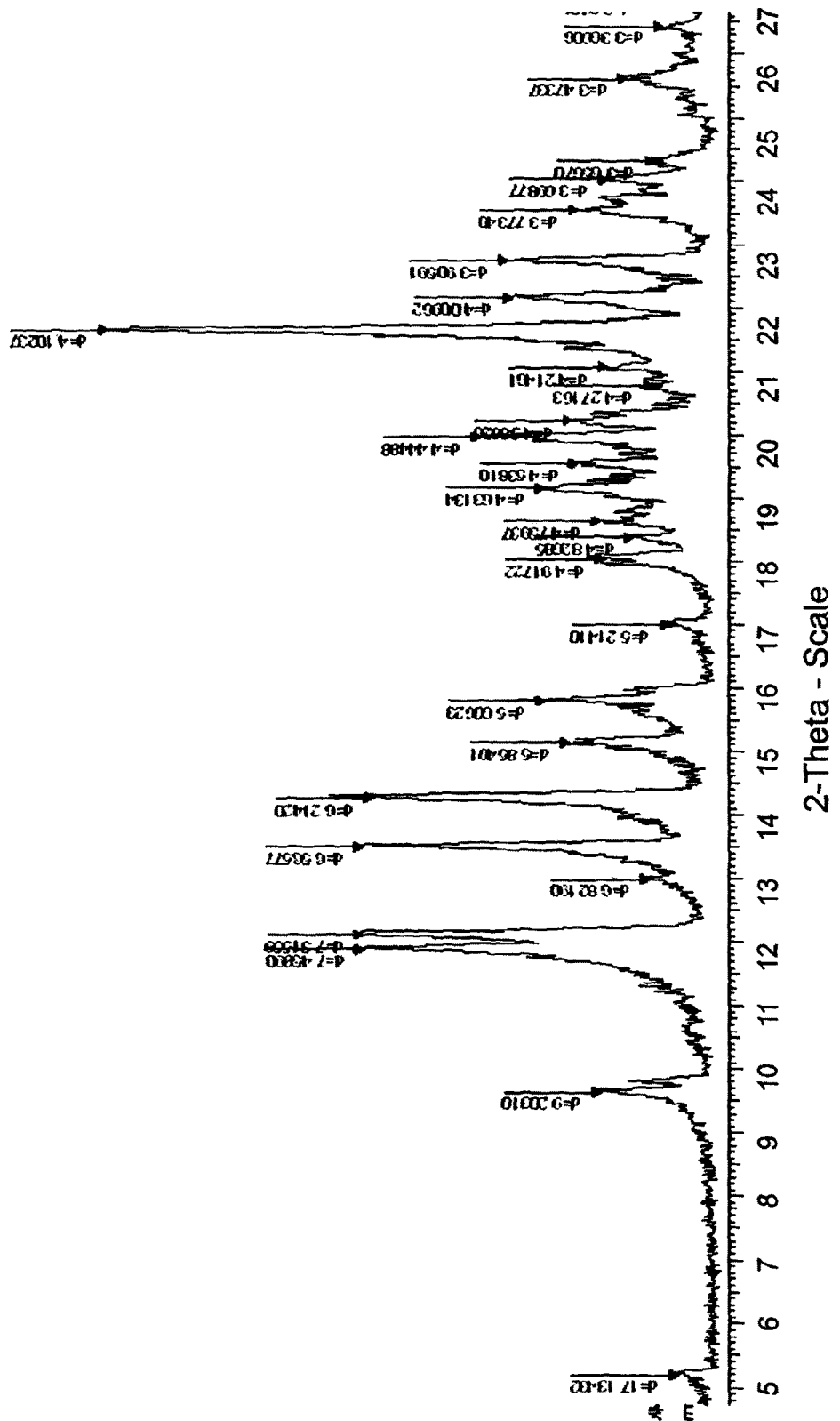
FIG. 15 is an XRD of the amorphous α-CD after exposure to 30% moisture content.
Figure 16:
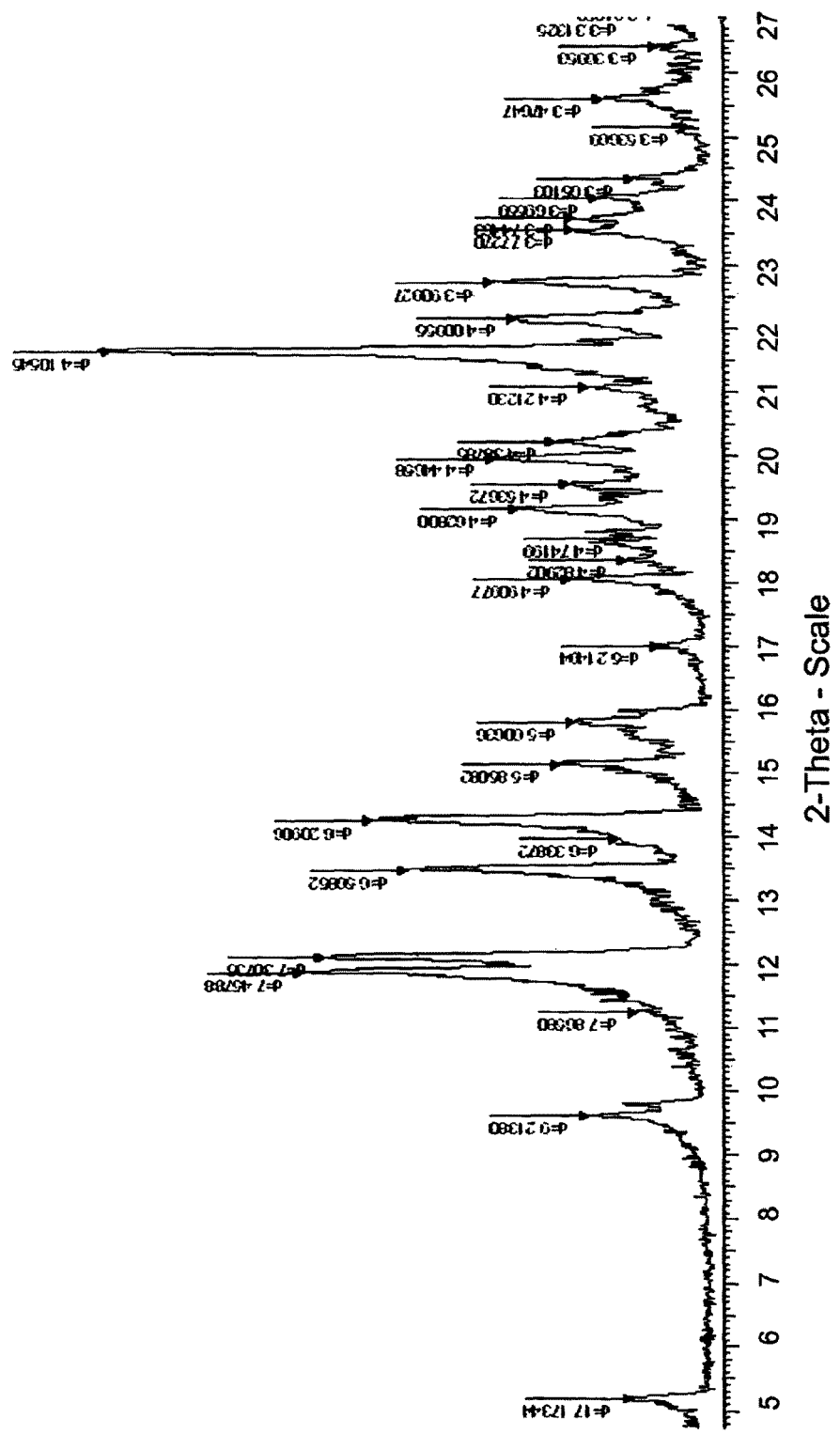
FIG. 16 is an XRD of the amorphous α-CD after exposure to 40% moisture content.

To ascertain the level of moisture the amorphous α-CD could be exposed to before it effectively recrystallised to adopt the crystalline form the amorphous α-CD of Batch 2 was moistened to 20%, 30% and 40% moisture contents in a closed container for over 2 weeks at 23° C. The results are shown in FIG. 13 where water activity is tracked. Water activity was measured using an Aqualab Water Activity Meter (Decagon Devices, Inc. Pullman, USA). Approximately 0.5 g of powder sample was placed into the Aqua lab and the $A_w$ was read after a 2 minute equilibration period. FIG. 13 shows that at 20% moisture content the amorphous α-CD behaves the same, in terms of water activity, as the crystalline α-CD which confirms its crystallisation at this moisture content. FIGS. 14-16 are XRDs of the amorphous α-CD at 20% (FIG. 14), 30% (FIG. 15) and 40% (FIG. 16) moisture contents. This clearly shows, in conjunction with FIG. 10, the physical differences between the amorphous and crystalline forms of α-CD. The difference in XRD patterns can therefore be used as an indication as to whether the α-CD is in the amorphous or crystalline form.

By way of comparison, the moisture content of the amorphous α-CD starting material (i.e. no encapsulated ethylene) was determined. The results showed that the moisture content was 5.10%±0.78 and the water activity was 0.16. It will be appreciated that the final moisture content of the amorphous α-CD will vary with operational temperatures including the inlet and outlet temperatures of the spray drier.

The effect of relative humidity (RH) on the release of ethylene gas from the ethylene-α-CD inclusion complex was also ascertained. Amorphous α-CD powder obtained from encapsulation at 1.5 MPa at 48 h (25° C.) was used (Batch 2 above). For this experiment, RH was controlled at 11.15%, 32.73%, and 75.32%, using saturated sodium chloride, magnesium chloride, and lithium chloride solutions respectively. The saturated salt solutions were prepared and allowed to equilibrate in an 18-liter plastic container for at least 24 hours before the experiment was conducted. Ethylene in the inclusion complexes was quantified using gas chromatography (GC) using headspace analysis. Subsequently, one gram of complex was weighed out into a 50×10 mm plastic petri dish and transferred into the 18-liter controlled relative humidity plastic container, fitted with an airtight cover. Samples of the inclusion complex with encapsulated ethylene were taken at 0 h, 1 h, 2 h, 3 h, 5 h, 7 h, 12 h, 24 h, 48 h, 72 h, 96 h, and 120 h at 25° C. Room humidity was 52±5% (25° C.). The results are shown in table 4 as well as being indicated in the graphs shown in FIG. 17.

TABLE 4

Ethylene release ratio at relative humidity levels of
11.15%, 32.73%, and 75.32% at 12 h, 72 h and 120 h.

| Variation of Relative Humidity | Ethylene release rate ratio | | |
|---|---|---|---|
| | 12 h | 72 h | 120 h |
| 11.15% | 0.58$^a$ | 0.67$^a$ | 0.74$^a$ |
| 32.73% | 0.70$^b$ | 0.80$^b$ | 0.85$^b$ |
| 75.32% | 0.97$^c$ | 0.97$^c$ | 0.94$^c$ |

*The same letters indicate no significant difference at p < 0.05.

The results show that different relative humidity greatly affects the release of ethylene from the amorphous ethylene-α-CD inclusion complex (p<0.05). The release rate ratio expresses the relative amount of ethylene released from the complex over time. The release of ethylene from the complex was also important to determine the shelf-life of the encapsulated product over a longer period. At 75.32% RH the ethylene release ratio showed the highest release at time intervals of 12 h, 72 h, and 120 h, followed by 32.73% RH and 11.15% RH respectively. Thus, a high relative humidity environment enhances the moisture uptake of amorphous complexes and consequently leads to increased ethylene release rates. Cyclodextrins are hygroscopic and absorb moisture when exposed to humidity. Higher relative humidity leads to the adsorption of water and increased dissolution, which might be the cause of break down of the inclusion complex.

Figure 17:
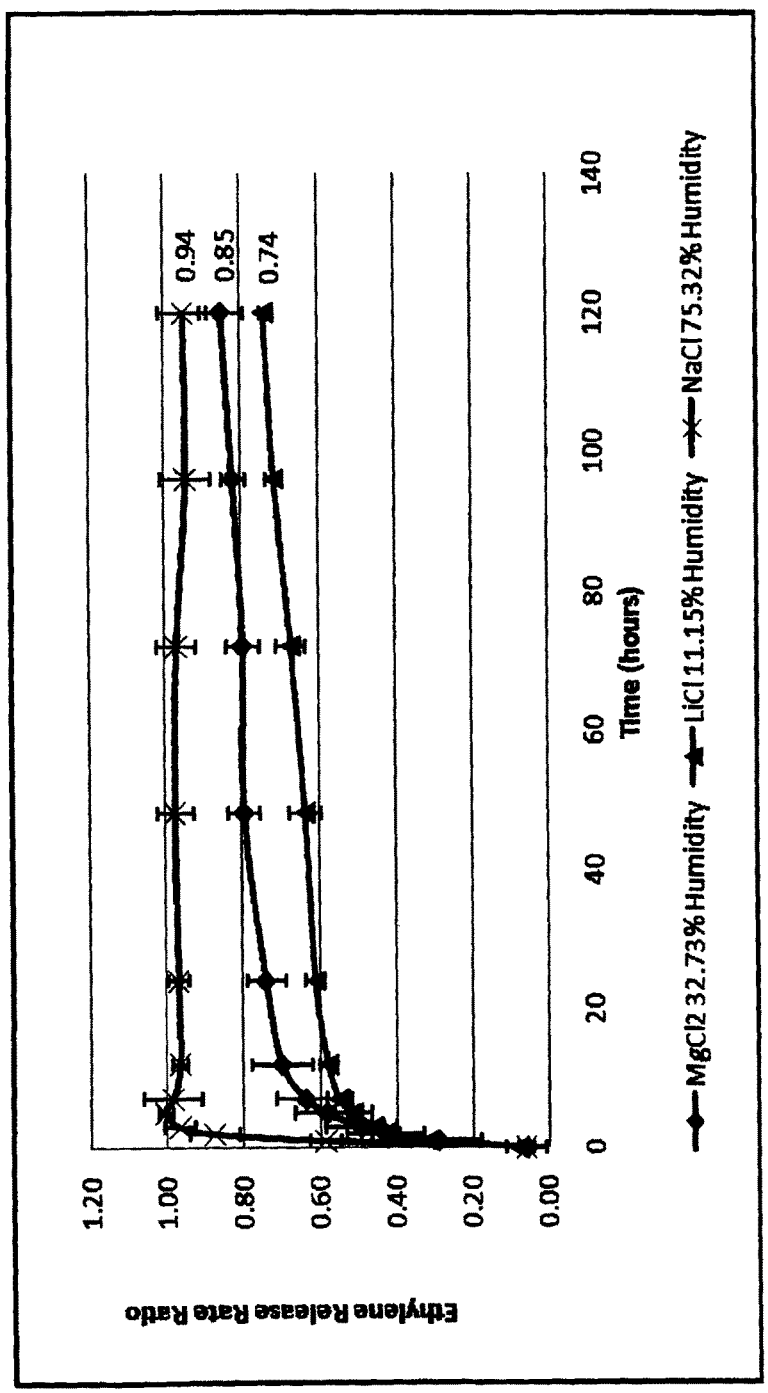
FIG. 17 is a graphical representation of the ethylene release rate ratio from the amorphous α-CD ethylene inclusion complex at differing humidity levels with time.

FIG. 17 shows the release of ethylene gas from the ethylene α-CD inclusion complex over a 120 h period. Again, the release of ethylene depended markedly upon RH with a value of 75.32% having the most rapid release as compared to 32.73% RH and 11.15% RH. Ethylene release at 75.32% RH attained equilibrium at the fifth hour, while 32.73% RH and 11.15% RH took longer to do so. For the results at a relative humidity of 75.32%, a slight decrease in release rate ratio is seen after about the seventy-second hour. Table 4 also indicated that at 75.32% RH, the ethylene release rate ratio decreased from 5 h to 120 h, with a ratio of 0.94 at 120 h. At the fifth hour, the ethylene release ratio had the highest release rate, and subsequently decreased from 7 h, where it attained equilibrium. It could be assumed that from the fifth hour onwards, all ethylene gas was released out of the complexes and became constant (0.97) (see Table 4) as no further ethylene gas was released into the atmosphere of the system. The decrease from 0.97 of 72 h to 0.94 of 120 h could, be due to minor leakage which might arise during the drawing the gas from the needles. Consequently, the small hole formed in the rubber seal, in which the gas was being drawn from, might also contribute to the leakage. These results strongly suggest that the release rate of ethylene can be controlled by the relative humidity of the surrounding environment.

Recrystallisation and Drying of Amorphous Crystallised α-CD Inclusion Complex

Figure 18:
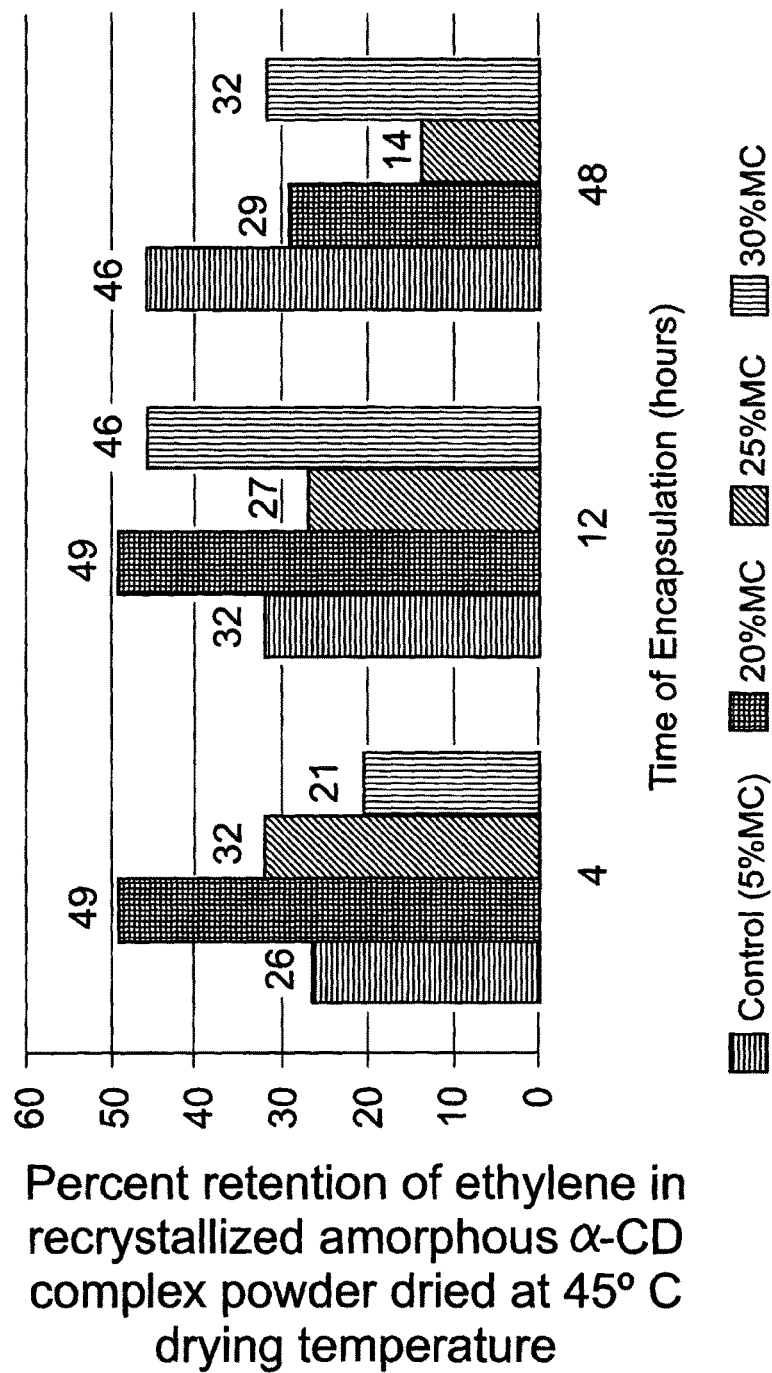
FIG. 18 is a graphical representation of the retention of ethylene within the crystalline α-CD ethylene inclusion complex after exposure to differing moisture contents and subsequent drying.

To better understand the behaviour of the amorphous α-CD with encapsulated ethylene, similar experiments to those described immediately above were carried out in that samples of the Batch 2 α-CD inclusion complex were moistened to one of 20%, 25% or 30% moisture levels in an enclosed environment and the system allowed to equilibrate for 12 h. This should cause at least some level of recrystallisation, as discussed above. The recrystallised material was then dried at three different temperatures being 40, 45 and 50° C. and the ethylene concentration in the samples then determined. The results are listed in table 5, below, and FIG. 18 is a graphical representation of the results obtained for the 45° C. drying temperature.

The results indicate that recrystallised complex product, which has been recrystallised from the amorphous α-CD ethylene inclusion complex, will hold the gaseous molecule better at atmospheric pressure and can therefore be easily packed into packaging containers of different sizes at atmospheric pressure. These results show that the best condition in this experiment was 20% moisture and a drying temperature of 45° C. It is, therefore, possible to optimise the conditions described to hold a maximum gas concentration during the recrystallisation and drying steps.

The recrystallised sample moistened to 20% was left in a sealed container for 8 months and the container then opened and the ethylene levels measured. Surprisingly, was found that the concentration of ethylene was unchanged and so this indicates that the moistened/recrystallised inclusion complex is very stable. This also indicates that the drying procedure outlined in the preceding paragraph is not actually required, i.e. drying is optional, so long as the recrystallised material is packed into a sealed container after contact with the moisture. It is also noted that the 20% moistened sample was still a flowable powder and so is suitable for handling. When drying is not employed then it may be of benefit to include a desiccant, such as silica gel, a clay or a zeolite, in the sealed container with the moistened inclusion complex to further assist with stabilising it. These results shown that a mixed amorphous/crystalline α-CD inclusion complex with ethylene can be formed simply which provides for excellent sustained release properties, can be stored in the long term and is less energy intensive to produce than existing means.

TABLE 5

Ethylene retention after recrystallisation at varying
moisture contents and drying and varying temperatures.

| Drying temp | Moisture content | Ethylene Conc mol/mol (Average) | SD | Percent retention |
|---|---|---|---|---|
| 40 | 5% MC Control | 0.4037 | 0.0143 | 42 |
| | 20% MC | 0.1060 | 0.0087 | 22 |
| | 25% MC | 0.1692 | 0.1286 | 35 |
| | 30% MC | 0.0620 | 0.0058 | 14 |
| 45 | 5% MC Control | 0.4417 | 0.0141 | 46 |
| | 20% MC | 0.1420 | 0.0645 | 29 |
| | 25% MC | 0.0679 | 0.0218 | 14 |
| | 30% MC | 0.1363 | 0.0203 | 32 |
| 50 | 5% MC Control | 0.4056 | 0.0255 | 42 |
| | 20% MC | 0.0976 | 0.0260 | 20 |
| | 25% MC | 0.0723 | 0.0500 | 15 |
| | 30% MC | 0.0443 | 0.0071 | 10 |

Pressure Determination of Ethylene from Amorphous α-CD Inclusion Complex

The pressure of ethylene gas from the ethylene-α-CD inclusion complex (Batch 2) was measured using a digital pressure gauge. Forty grams of the inclusion complex was weighed out into a 40 mL glass bottle. The pressure was quantified using pressure gauge headspace analysis with an airtight cover. The inclusion complex powder was held in the bottle for 120 h (5 days) (25° C.). The pressure of ethylene gas release was checked at time intervals of 0 h, 0.25 h, 0.5 h, 1 h, 2 h, 3 h, 5 h, 7 h, 12 h, 24 h, 48 h, 72 h, 96 h, and 120 h.

Figure 19:
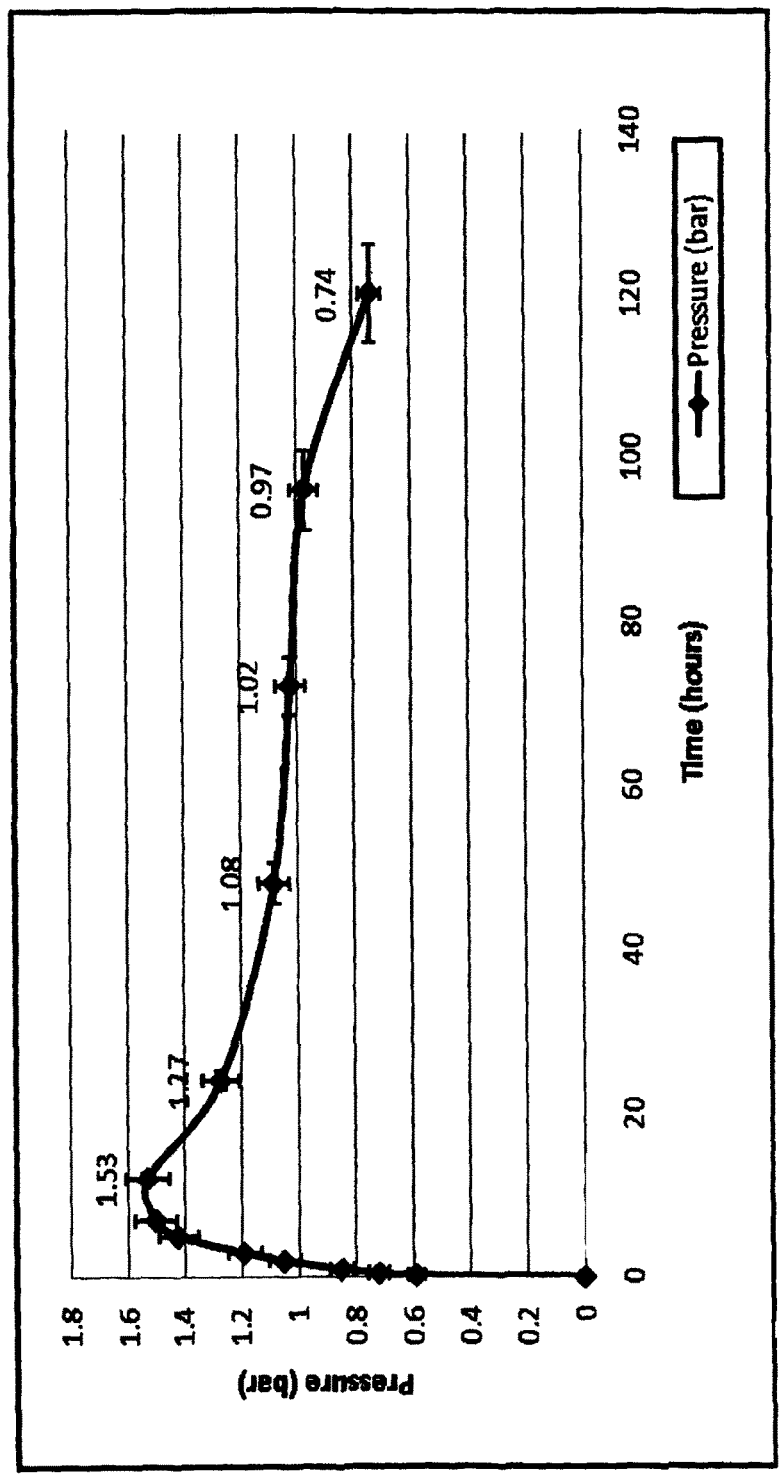
FIG. 19 is a graphical representation of the head space pressure due to ethylene release from the amorphous α-CD ethylene inclusion complex with time.
Figure 20:
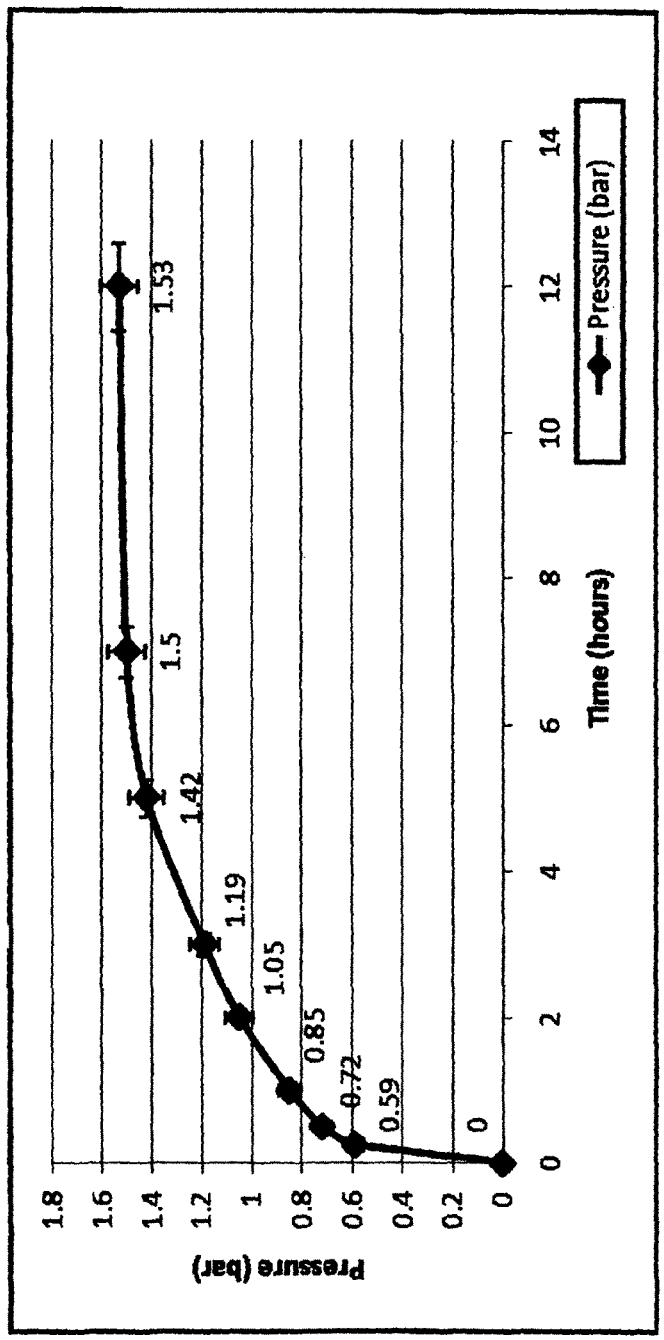
FIG. 20 is a graphical representation of the first 12$h$ of the profile shown in FIG. 19.

FIG. 19 shows the pressure dramatically increased from 0 h to 12 h before gradually decreasing towards 120 h. The 12 h result showed the highest pressure of 1.53 bar (0.153 MPa). The pressure slightly decreased from 12 h to 120 h, and the pressure was 0.74 bar (0.074 MPa) at 120 h. FIG. 20 shows an expanded 0 to 12 h view of the results shown in FIG. 19. The pressure reached equilibrium between about 7 h to 12 h after which the pressure dropped to an extent. This could be attributable to minor leakage during measurement of pressure and internal factors including spontaneous reverse of the release process i.e. gas penetration back into the amorphous α-CD. Spontaneous reverse of gas penetration into the amorphous α-CD complex in the system occurs when the pressure is high enough to push the gas back into the complex.

The pressure of 1.53 bar (0.153 MPa) was used to calculate the percentage of the ethylene released to the headspace. The percentage showed a proportion in the headspace was 11.33%, indicating that the ethylene gas inside the amorphous α-CD complex was approximately 90%. This showed that ethylene gas was released gradually and inversely increased with the pressure. These results indicate that controlled release of ethylene is possible when the amorphous inclusion complexes are packed into controlled release/pressure controlled product packages.

Amorphous α-CD with Encapsulated $CO_2$ and Subsequent Release Properties

Carbon dioxide was complexed with amorphous cyclodextrin at a pressure of 15 bars (1.5 MPa) for 48 hours in the manner described above for Batch 2 with ethylene. At this given condition the weight percentage complexed $CO_2$ was 1.35% (weight of $CO_2$/weight of complex powder×100). The complex powders were investigated for their release properties at different humidity's (33, 75 and 98% relative humidity's at 23° C.) and with or without deliquescent salts ($CaCl_2$). The results are shown in FIGS. 21 and 22.

Figure 21:
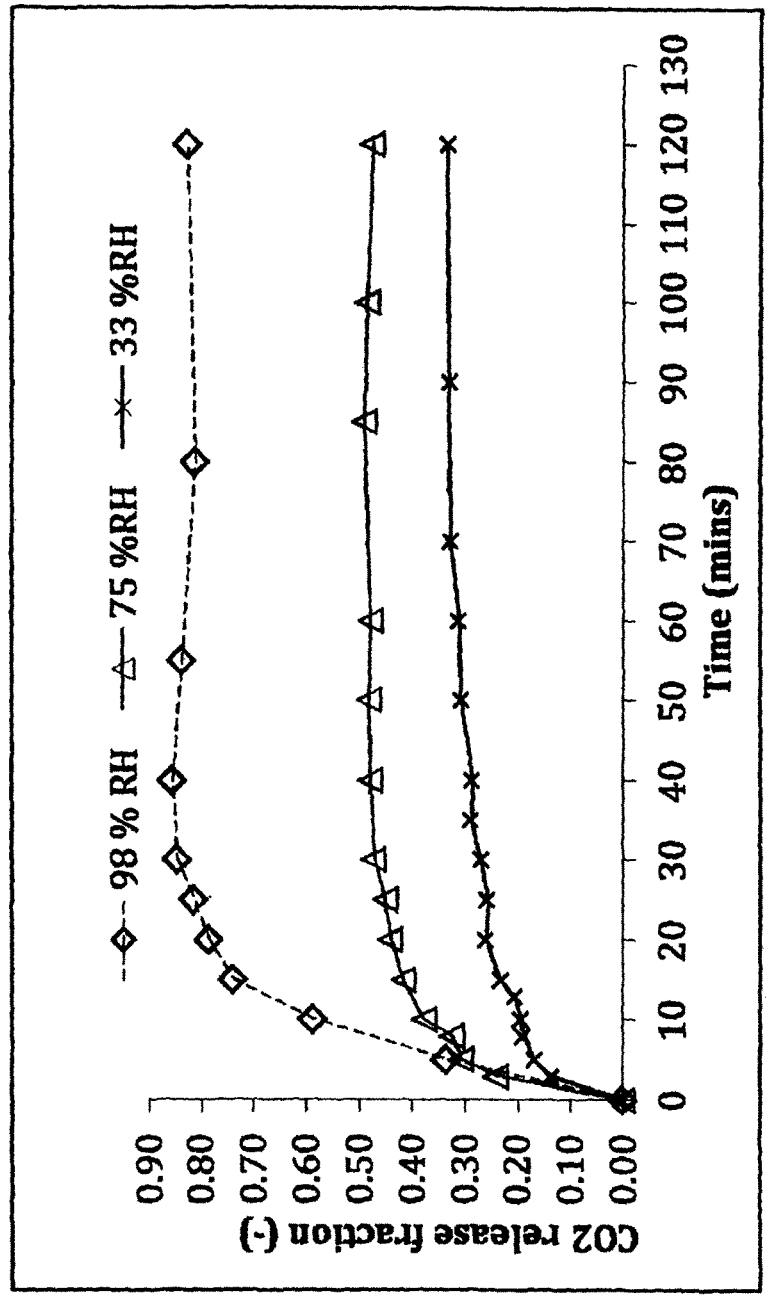
FIG. 21 is a graphical representation of the rate of release of carbon dioxide from the amorphous α-CD carbon dioxide inclusion complex.
Figure 22:
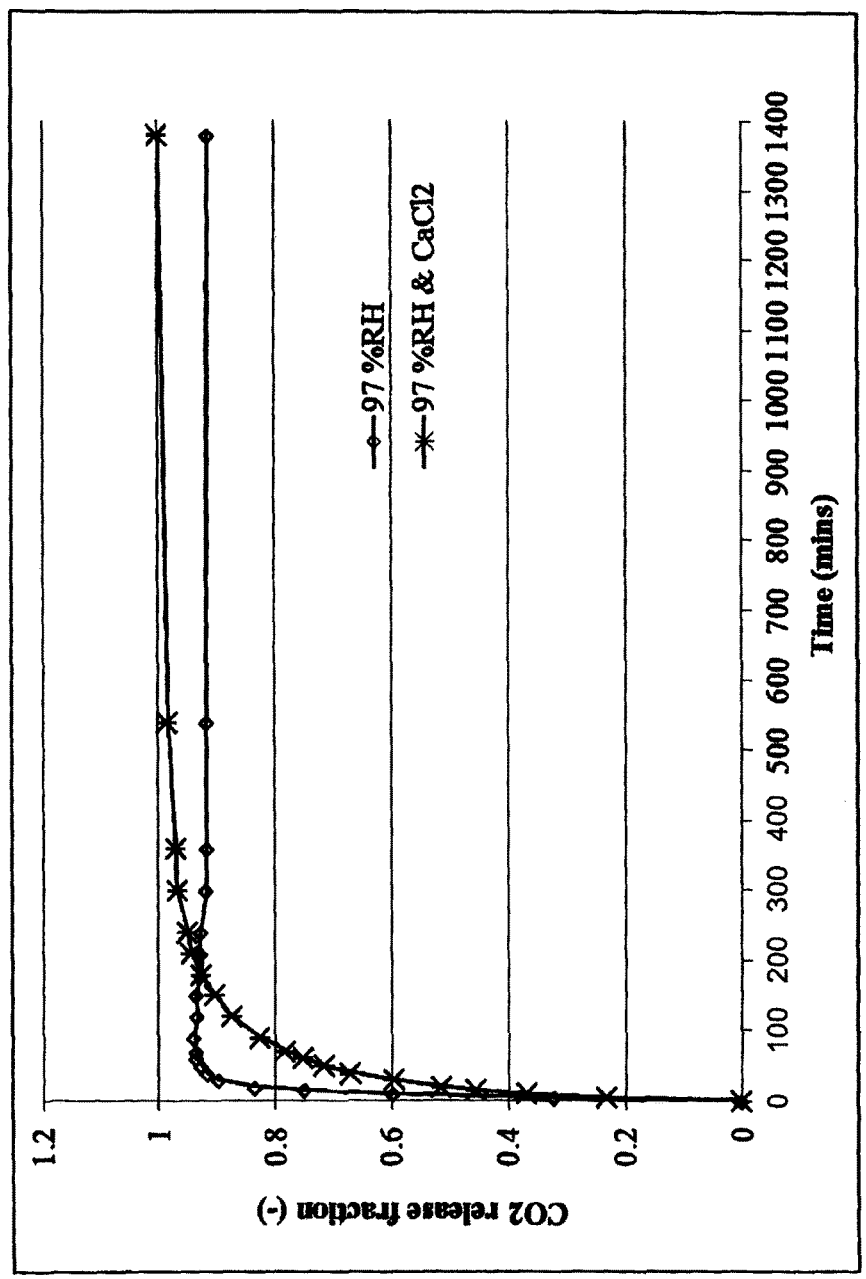
FIG. 22 a graphical representation of the rate of release of carbon dioxide from the amorphous α-CD carbon dioxide inclusion complex at 97% relative humidity with and without the presence of a deliquescent salt.

FIG. 21 reflects the results already seen and discussed for ethylene in that the gas release rate is increased at increasing humidity levels with release increasing sharply initially and then the rate of release tailing off after 30-40 mins. FIG. 22 shows that the use of a deliquescent salt assists in solubilising the amorphous α-CD inclusion complex and increases the total amount of released gas. It may therefore be useful to employ such salts in any release composition.

Use of the Amorphous α-CD Inclusion Complex to Ripen Fruit in Transit 100 g of the amorphous α-CD with encapsulated ethylene as indentified in table 1 was placed in the interior of a closed trailer carrying 20 tonnes of unripe mangoes. The container was as shown in FIG. 7. The mangoes were transported on a 4 day journey from Katherine, Northern Territory, Australia to Adelaide in South Australia. It was found that the 100 g of inclusion complex was sufficient to ripen the 20 tonne cargo of unripe mangoes and that these mangoes were ready for market after 7 days, 6 days sooner than mangoes ripened in the standard manner, i.e. via transportation and then ripening in ripening rooms.

Figure 23:
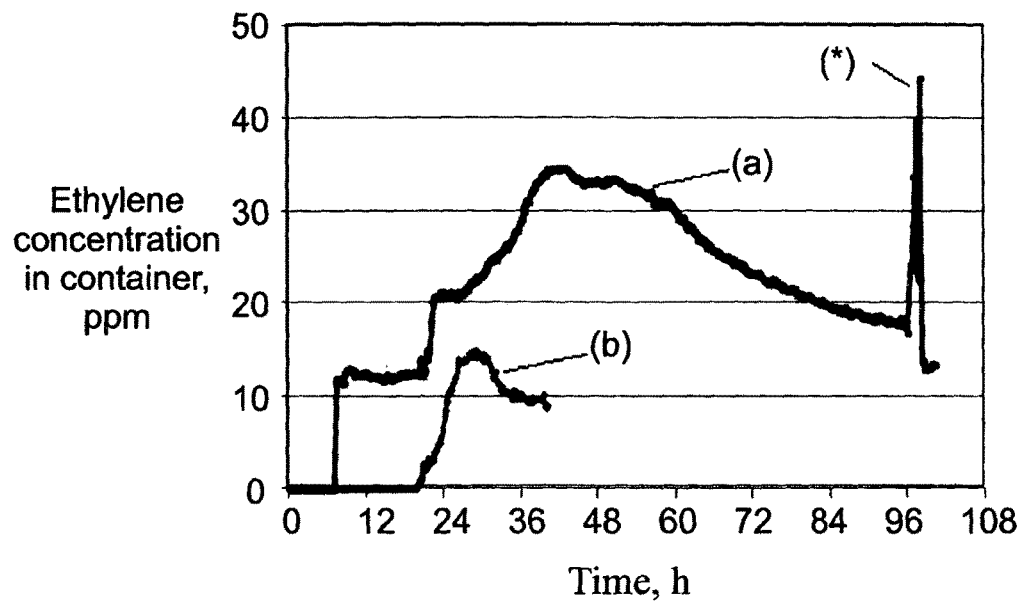
FIG. 23 is a graphical representation of the ethylene concentration obtained during a mango ripening in transit experiment.

The ethylene concentration was measured during transit and is shown in FIG. 23 wherein the line marked (a) represents the ethylene concentration at the source and (b) represents the ethylene concentration in the middle of the mango container. From this it can be seen that the critical ethylene concentration of about 10 ppm which is required to initiate mango ripening was reached within a 24 hr period. This level was maintained until at least 40 hrs beyond which the data recorder malfunctioned.

Figure 24:
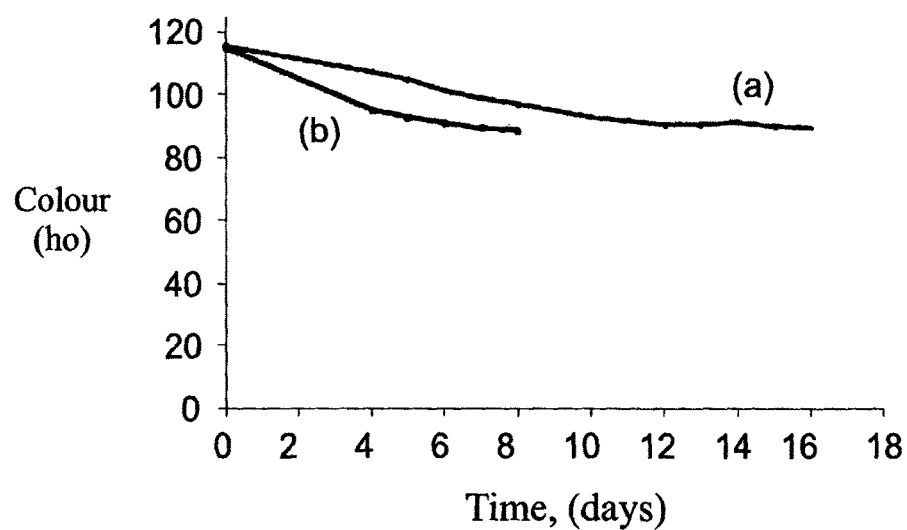
FIG. 24 is a graphical representation of the color change of the mangoes during the ripening in transit experiment.
Figure 25:
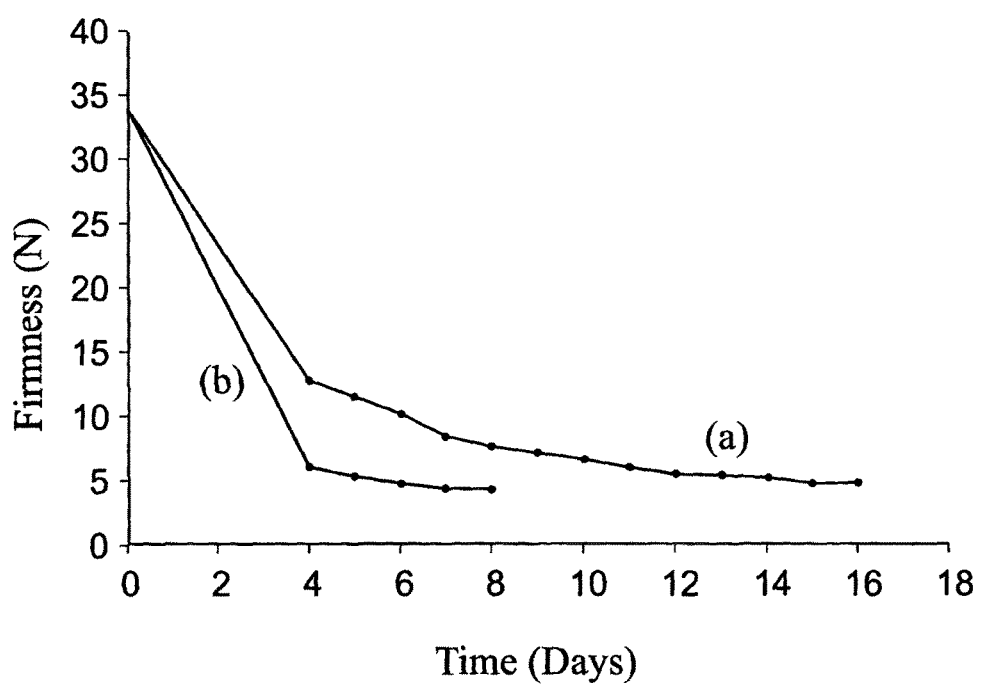
FIG. 25 is a graphical representation of the change in firmness of the mangoes during the ripening in transit experiment.

The ripening effect of the present inclusion complex can be seen in FIGS. 24 and 25. FIG. 24 shows that the expected color change of the inclusion complex treated mangoes was effected sooner than the control mangoes which were not exposed to ethylene from any source while FIG. 25 reflects a similar early change in the firmness of the treated mangoes indicating their change to a soft ripened state.

The present invention thus provides for novel inclusion complexes of amorphous CD encapsulating gaseous molecules such as ethylene. Also provided is a novel method of forming such complexes by direct exposure of the gaseous guest molecule to the dry amorphous CD powder. The production of this inclusion complex occurs relatively rapidly compared to existing methods and results in conversion of substantially all of the amorphous CD into inclusion complex form. These inclusion complexes have been shown to be advantageous in the ripening of fruit, particularly during transport of the fruit. Their use is safer than direct release of ethylene from a pressurised container but allows fruit ripening levels of ethylene to be attained in proximity to the fruit in a short period of time due to the rapid release kinetics. It is a further advantage that the inclusion complexes of the invention do not need elevated temperatures or a high humidity atmosphere to effect release of the ethylene.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiment

The invention claimed is:

1. An inclusion complex consisting of (i) an amorphous cyclodextrin molecule, or amorphous derivative thereof, wherein the amorphous cyclodextrin molecule defines an internal cavity and (ii) an encapsulated gaseous molecule accommodated within the internal cavity of the amorphous cyclodextrin molecule.

2. The inclusion complex of claim 1 wherein the amorphous cyclodextrin is an α-, β- or γ-cyclodextrin or an alkylated, hydroxylated or sulfonated derivative thereof.

3. The inclusion complex of claim 1 wherein the amorphous cyclodextrin is amorphous α-cyclodextrin.

4. The inclusion complex of claim 1 wherein the gaseous molecule is selected from the group consisting of methane, ethane, propane, ethylene, propylene, butylene, 1-methylcyclopropene, carbon dioxide and nitrous oxide.

5. The inclusion complex of claim 1 comprising at least 0.7 moles of ethylene per mole of α-cyclodextrin.

6. The inclusion complex of claim 1 as defined by the XRD data shown in FIG 1.

7. A method of producing the inclusion complex of claim 1, including the steps of:
   (a) providing a solution of a cyclodextrin, or derivative thereof;
   (b) actively removing solvent from the solution of cyclodextrin to form a solid amorphous cyclodextrin, or amorphous derivative thereof, powder; and (c) exposing the solid amorphous cyclodextrin, or amorphous derivative thereof, powder to a gaseous molecule, to thereby produce the inclusion complex.

8. The method of claim 7 wherein the cyclodextrin is an α-, β- or γ-cyclodextrin or an alkylated, hydroxylated or sulfonated derivative thereof.

9. The method of claim 7 wherein the gaseous molecule is selected from the group consisting of methane, ethane, propane, ethylene, propylene, butylene, 1-methylcyclopropene, carbon dioxide and nitrous oxide.

10. The method of claim 7 wherein the step of removing the solvent includes the step of evaporating the solvent and/or freeze drying the solution and/or spray drying the solution of cyclodextrin.

11. The method of claim 7 wherein the solution is formed using a polar, semi-polar or ionic solvent.

12. The method of claim 7 wherein the solution is an aqueous solution.

13. The method of claim 7 wherein the amorphous cyclodextrin is dry prior to exposure to the gaseous molecule.

14. The method of claim 7 wherein the amorphous cyclodextrin powder is exposed to the gaseous molecule in a closed gas tight environment at a pressure above atmospheric pressure.

15. The method of claim 7 wherein the amorphous cyclodextrin powder is exposed to the gaseous molecule at a pressure of between about 0.5MPa to about 3 MPa.

16. A method of ripening a fruit including the step of exposing the fruit to an effective amount of the inclusion complex of claim 1.

17. The method of claim 16 wherein the step of exposing the fruit to the inclusion complex occurs while the fruit is in transit.

18. The method of claim 16 wherein the exposure occur via a controlled release device.

19. The method of claim 16 wherein the exposure of the fruit to the inclusion complex does not require solubilisation or partial dissolution of the inclusion complex to release the encapsulated gaseous molecule.

20. The method of claim 16 wherein the exposure of the fruit to the inclusion complex occurs at a temperature between about 10° C. to about 20° C.

* * * * *